(12) United States Patent
Raghavan et al.

(10) Patent No.: US 12,107,646 B2
(45) Date of Patent: Oct. 1, 2024

(54) TECHNIQUES FOR MANAGING LOW OR VARIABLE PHASE SHIFT RESOLUTIONS IN BEAM-BASED COMMUNICATIONS

(71) Applicant: QUALCOMM Incorporated, San Diego, CA (US)

(72) Inventors: Vasanthan Raghavan, West Windsor Township, NJ (US); Shrenik Patel, San Diego, CA (US); Rajagopalan Rangarajan, San Diego, CA (US); Damin Cao, San Diego, CA (US); Kang Yang, San Diego, CA (US); Jung Ho Ryu, Fort Lee, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 17/946,937

(22) Filed: Sep. 16, 2022

(65) Prior Publication Data
US 2024/0097749 A1    Mar. 21, 2024

(51) Int. Cl.
| H04L 23/02 | (2006.01) |
| H04B 7/01 | (2006.01) |
| H04B 7/0426 | (2017.01) |
| H04W 8/22 | (2009.01) |
| H04W 72/044 | (2023.01) |

(52) U.S. Cl.
CPC .............. *H04B 7/043* (2013.01); *H04B 7/01* (2013.01); *H04W 8/22* (2013.01); *H04W 72/046* (2013.01); *H04W 72/0473* (2013.01)

(58) Field of Classification Search
CPC ....... H04B 7/0695; H04B 7/01; H04L 5/0048; H04L 10/564; H04L 10/548; H04W 72/046; H04W 16/28; H04W 4/70; H01Q 3/36; H01Q 3/38
USPC ........................... 375/262.26, 267, 262, 260
See application file for complete search history.

(56) References Cited

U.S. PATENT DOCUMENTS

| 2009/0136857 A1* | 5/2009 | Kamat ...................... G03F 1/30 |
| | | 430/5 |
| 2021/0258061 A1* | 8/2021 | Harrebek ............. H04B 7/0404 |
| 2021/0306042 A1* | 9/2021 | Bshara ................. H04B 7/0695 |
| 2021/0384954 A1* | 12/2021 | Caporal Del Barrio ..................... |
| | | H04B 7/0617 |
| 2022/0110004 A1* | 4/2022 | Horn ................... H04W 72/046 |

(Continued)

*Primary Examiner* — Khai Tran
(74) *Attorney, Agent, or Firm* — Holland & Hart LLP

(57) ABSTRACT

Methods, systems, and devices for wireless communication are described. In some systems, a user equipment (UE) may transmit, to a network entity, a first signal including a request to update a resolution of a phase shifting operation associated with beam-based communications. The UE may receive, from the network entity, a second signal approving the request. The UE may communicate using a beam according to an updated resolution of the phase shifting operation based on the second signal approving the request. Additionally, or alternatively, the UE may transmit a first signal including a request to suspend a beam refinement process based on the resolution of the phase shifting operation. The UE may receive a second signal approving the request to suspend the beam refinement process. The UE may communicate with the network entity using a beam based on suspending further beam refinement in response to the second signal.

27 Claims, 22 Drawing Sheets

(56) References Cited

U.S. PATENT DOCUMENTS

| | | | |
|---|---|---|---|
| 2023/0095788 A1* | 3/2023 | Wang | H01Q 3/36 343/702 |
| 2023/0253704 A1* | 8/2023 | Sundström | H01Q 3/38 375/267 |

* cited by examiner

TECHNIQUES FOR MANAGING LOW OR VARIABLE PHASE SHIFT RESOLUTIONS IN BEAM-BASED COMMUNICATIONS

FIELD OF TECHNOLOGY

The following relates to wireless communications, including techniques for managing low or variable phase shift resolutions in beam-based communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a UE may communicate with a network entity via one or more sets of beam weights. Particular examples of this scenario include communications over millimeter wave (mmW) frequencies, sub-Terahertz frequencies, and frequencies of the Frequency Range 3 (or FR3) within the 7.125 to 24.25 gigahertz (GHz) regime. The UE may use a phase shifter to configure a phase for each antenna element over which beam-based communications are configured (e.g., for a transmit beam, a receive beam, or a beam supporting both transmission and reception). A precision of the phase shifter may affect the performance of the beam-based communications and, in particular, the interference caused by the beam-based communications. However, the precision of the phase shifter may additionally affect the processing overhead at the UE for processing the beam-based communications. Accordingly, in some cases, using a relatively high-precision phase shifter may result in a significant processing overhead at the UE (e.g., greater than a processing threshold), potentially leading to inefficiencies in the wireless communications system.

SUMMARY

The described techniques relate to improved methods, systems, devices, and apparatuses that support managing low or variable phase shift resolutions in beam-based communications. For example, the described techniques provide for a user equipment (UE) to request to dynamically update a resolution of a phase shift operation. Additionally, or alternatively, the described techniques provide for a UE to request to suspend or activate a beam refinement process based on reported interference metrics. In some cases, the UE may transmit, to a network entity, a signal including a request to update a resolution of a phase shifting operation associated with beam-based communications. The UE may receive, from the network entity, a response signal approving the request to update the resolution of the phase shifting operation. The UE may communicate using a set of beam weights according to an updated resolution of the phase shifting operation based on the second signal approving the request. In some examples, the UE may dynamically reduce the phase shifting resolution to improve a processing overhead at the UE associated with phase shifting. In some other examples, the UE may dynamically increase the phase shifting resolution to improve performance associated with the beam-based communications. Additionally, or alternatively, the UE may transmit a signal including a request to suspend a beam refinement process based on the resolution of the phase shifting operation. The UE may receive a response signal approving or denying the request to suspend the beam refinement process. The UE may communicate using a beam according to suspending the beam refinement process based on the second signal approving the request. In some examples, the UE may suspend beam refinement to refrain from switching to a beam that may potentially cause significant interference to one or more other devices in a wireless communications system.

A method for wireless communications at a UE is described. The method may include transmitting, to a network entity, a first signal including a request to update a resolution of a phase shifting operation associated with beam-based communications, receiving, from the network entity, a second signal approving the request to update the resolution of the phase shifting operation, and communicating using a beam according to an updated resolution of the phase shifting operation based on the second signal approving the request.

An apparatus for wireless communications at a UE is described. The apparatus may include a processor, memory coupled with the processor, and instructions stored in the memory. The instructions may be executable by the processor to cause the apparatus to transmit, to a network entity, a first signal including a request to update a resolution of a phase shifting operation associated with beam-based communications, receive, from the network entity, a second signal approving the request to update the resolution of the phase shifting operation, and communicate using a beam according to an updated resolution of the phase shifting operation based on the second signal approving the request.

Another apparatus for wireless communications at a UE is described. The apparatus may include means for transmitting, to a network entity, a first signal including a request to update a resolution of a phase shifting operation associated with beam-based communications, means for receiving, from the network entity, a second signal approving the request to update the resolution of the phase shifting operation, and means for communicating using a beam according to an updated resolution of the phase shifting operation based on the second signal approving the request.

A non-transitory computer-readable medium storing code for wireless communications at a UE is described. The code may include instructions executable by a processor to transmit, to a network entity, a first signal including a request to update a resolution of a phase shifting operation associated with beam-based communications, receive, from the network entity, a second signal approving the request to update the resolution of the phase shifting operation, and communicate using a beam according to an updated resolution of the phase shifting operation based on the second signal approving the request.

Some examples of the method, apparatuses, and non-transitory computer-readable medium described herein may further include operations, features, means, or instructions for transmitting, to the network entity, a third signal including UE capability information indicating that the UE may be capable of updating the resolution of the phase shifting operation, where the request to update the resolution of the phase shifting operation may be based on the UE capability information.

Some examples of the method, apparatuses, and non-transitory computer-readable medium described herein may further include operations, features, means, or instructions for refraining from performing one or more steps of the phase shifting operation in response to the second signal approving the request, the updated resolution of the phase shifting operation corresponding to the refraining from performing the one or more steps.

In some examples of the method, apparatuses, and non-transitory computer-readable medium described herein, the phase shifting operation may be based on a set of multiple bits and the method, apparatuses, and non-transitory computer-readable medium may include further operations, features, means, or instructions for performing phase shifting using a subset of the set of multiple bits for the phase shifting operation, where the refraining from performing the one or more steps may be based on the subset of the set of multiple bits.

In some examples of the method, apparatuses, and non-transitory computer-readable medium described herein, the UE may be configured with a set of multiple phase shifters including at least a first phase shifter and a second phase shifter, and the method, apparatuses, and non-transitory computer-readable medium may include further operations, features, means, or instructions for switching from the first phase shifter with a first phase shifting resolution to the second phase shifter with a second phase shifting resolution in response to the second signal approving the request, the updated resolution of the phase shifting operation corresponding to the second phase shifting resolution.

In some examples of the method, apparatuses, and non-transitory computer-readable medium described herein, the first signal further indicates a power saving value for the update to the resolution of the phase shifting operation, a difference value between a first array gain of a main lobe and a second array gain of a side lobe in a selected direction for the beam-based communications, the selected direction of the side lobe with the second array gain, or a combination thereof. In some examples of the method, apparatuses, and non-transitory computer-readable medium described herein, the second signal approves the request based on the power saving value, the difference value, the selected direction of the side lobe, or a combination thereof.

In some examples of the method, apparatuses, and non-transitory computer-readable medium described herein, the first signal including the request to update the resolution of the phase shifting operation may be transmitted based on the difference value satisfying a threshold difference value for the main lobe and the side lobe.

Some examples of the method, apparatuses, and non-transitory computer-readable medium described herein may further include operations, features, means, or instructions for storing a lookup table indicating the power saving value, the difference value, the selected direction of the side lobe, or a combination thereof based on the updated resolution of the phase shifting operation, where the first signal may be based on the lookup table.

In some examples of the method, apparatuses, and non-transitory computer-readable medium described herein, the difference value between the first array gain of the main lobe and the second array gain of the side lobe may be based on an antenna array size for the UE, a steering direction for the beam, the updated resolution of the phase shifting operation, or a combination thereof.

In some examples of the method, apparatuses, and non-transitory computer-readable medium described herein, the first signal includes uplink control information (UCI), a first medium access control (MAC) control element (CE), a first radio resource control (RRC) signal, or a combination thereof. In some examples of the method, apparatuses, and non-transitory computer-readable medium described herein, the second signal includes downlink control information (DCI), a second MAC-CE, a second RRC signal, or a combination thereof.

A method for wireless communications at a UE is described. The method may include transmitting, to a network entity, a first signal including a request to suspend a beam refinement process at the UE based on a resolution of a phase shifting operation associated with beam-based communications, receiving, from the network entity, a second signal approving the request to suspend the beam refinement process at the UE, and communicating using a beam according to suspending the beam refinement process at the UE based on the second signal approving the request.

An apparatus for wireless communications at a UE is described. The apparatus may include a processor, memory coupled with the processor, and instructions stored in the memory. The instructions may be executable by the processor to cause the apparatus to transmit, to a network entity, a first signal including a request to suspend a beam refinement process at the UE based on a resolution of a phase shifting operation associated with beam-based communications, receive, from the network entity, a second signal approving the request to suspend the beam refinement process at the UE, and communicate using a beam according to suspending the beam refinement process at the UE based on the second signal approving the request.

Another apparatus for wireless communications at a UE is described. The apparatus may include means for transmitting, to a network entity, a first signal including a request to suspend a beam refinement process at the UE based on a resolution of a phase shifting operation associated with beam-based communications, means for receiving, from the network entity, a second signal approving the request to suspend the beam refinement process at the UE, and means for communicating using a beam according to suspending the beam refinement process at the UE based on the second signal approving the request.

A non-transitory computer-readable medium storing code for wireless communications at a UE is described. The code may include instructions executable by a processor to transmit, to a network entity, a first signal including a request to suspend a beam refinement process at the UE based on a resolution of a phase shifting operation associated with beam-based communications, receive, from the network entity, a second signal approving the request to suspend the beam refinement process at the UE, and communicate using a beam according to suspending the beam refinement process at the UE based on the second signal approving the request.

Some examples of the method, apparatuses, and non-transitory computer-readable medium described herein may further include operations, features, means, or instructions for communicating using the beam prior to the beam refinement process, where the beam includes a first beam associated with a first beamwidth, and determining that a set of multiple second beams associated with a second beamwidth and corresponding to a next stage of the beam refinement process fail to satisfy a threshold difference between a first array gain of a main lobe and a second array gain of a side lobe, where the first signal including the request to suspend the beam refinement process may be transmitted based on the determining.

Some examples of the method, apparatuses, and non-transitory computer-readable medium described herein may further include operations, features, means, or instructions for communicating using the beam prior to the beam refinement process, where the beam includes a first beam associated with a first beamwidth, receiving one or more reference signals for the beam refinement process, selecting a second beam associated with a second beamwidth for a next stage of the beam refinement process based on the one or more reference signals, and determining that the second beam fails to satisfy a threshold difference between a first array gain of a main lobe and a second array gain of a side lobe, where the first signal including the request to suspend the beam refinement process may be transmitted based on the determining.

Some examples of the method, apparatuses, and non-transitory computer-readable medium described herein may further include operations, features, means, or instructions for transmitting, to the network entity, a third signal including a second request to activate the beam refinement process at the UE, receiving, from the network entity, a fourth signal approving the second request to activate the beam refinement process at the UE, and performing the beam refinement process for the beam according to activating the beam refinement process at the UE based on the fourth signal.

In some examples of the method, apparatuses, and non-transitory computer-readable medium described herein, the second signal includes a one-bit field indicating to activate or suspend the beam refinement process.

In some examples of the method, apparatuses, and non-transitory computer-readable medium described herein, the first signal including the request to suspend the beam refinement process may be transmitted further based on a threshold difference between a first array gain of a main lobe and a second array gain of a side lobe, an interference threshold for the beam-based communications, one or more steering directions, or a combination thereof.

A method for wireless communications is described. The method may include receiving a first signal including a request to update a resolution of a phase shifting operation at a UE, transmitting a second signal approving the request to update the resolution of the phase shifting operation based on first location information for the UE and second location information for one or more other UEs, and communicating based on the second signal approving the request.

An apparatus for wireless communications is described. The apparatus may include a processor, memory coupled with the processor, and instructions stored in the memory. The instructions may be executable by the processor to cause the apparatus to receive a first signal including a request to update a resolution of a phase shifting operation at a UE, transmit a second signal approving the request to update the resolution of the phase shifting operation based on first location information for the UE and second location information for one or more other UEs, and communicate based on the second signal approving the request.

Another apparatus for wireless communications is described. The apparatus may include means for receiving a first signal including a request to update a resolution of a phase shifting operation at a UE, means for transmitting a second signal approving the request to update the resolution of the phase shifting operation based on first location information for the UE and second location information for one or more other UEs, and means for communicating based on the second signal approving the request.

A non-transitory computer-readable medium storing code for wireless communications is described. The code may include instructions executable by a processor to receive a first signal including a request to update a resolution of a phase shifting operation at a UE, transmit a second signal approving the request to update the resolution of the phase shifting operation based on first location information for the UE and second location information for one or more other UEs, and communicate based on the second signal approving the request.

Some examples of the method, apparatuses, and non-transitory computer-readable medium described herein may further include operations, features, means, or instructions for receiving, from a network entity, a third signal indicating at least a portion of the second location information for the one or more other UEs, where the second signal approves the request based on the third signal.

Some examples of the method, apparatuses, and non-transitory computer-readable medium described herein may further include operations, features, means, or instructions for transmitting a fourth signal requesting location information from the UE, the one or more other UEs, the network entity, or a combination thereof, where the second signal approves the request based on the fourth signal requesting the location information.

Some examples of the method, apparatuses, and non-transitory computer-readable medium described herein may further include operations, features, means, or instructions for determining a direction of interference from the UE based on the request to update the resolution of the phase shifting operation, where the second signal approves the request based on the direction of interference and the second location information for the one or more other UEs.

Some examples of the method, apparatuses, and non-transitory computer-readable medium described herein may further include operations, features, means, or instructions for receiving a third signal including a second request to update a resolution of a second phase shifting operation at a second UE and transmitting a fourth signal denying the second request to update the resolution of the second phase shifting operation based on third location information for the second UE and the second location information for the one or more other UEs.

Some examples of the method, apparatuses, and non-transitory computer-readable medium described herein may further include operations, features, means, or instructions for receiving a third signal including UE capability information indicating that the UE may be capable of updating the resolution of the phase shifting operation, where the request to update the resolution of the phase shifting operation may be based on the UE capability information.

In some examples of the method, apparatuses, and non-transitory computer-readable medium described herein, the first signal further indicates a power saving value for the update to the resolution of the phase shifting operation, a difference value between a first array gain of a main lobe and a second array gain of a side lobe in a selected direction, the selected direction of the side lobe with the second array gain, or a combination thereof. In some examples of the method, apparatuses, and non-transitory computer-readable medium described herein, the second signal approves the request based on the power saving value, the difference value, the selected direction of the side lobe, or a combination thereof.

In some examples of the method, apparatuses, and non-transitory computer-readable medium described herein, the first signal includes UCI, a first MAC-CE, a first RRC signal, or a combination thereof, and the second signal includes DCI, a second MAC-CE, a second RRC signal, or a combination thereof.

A method for wireless communications is described. The method may include receiving a first signal including a request to suspend a beam refinement process at a UE based on a resolution of a phase shifting operation at the UE, transmitting a second signal approving the request to suspend the beam refinement process at the UE based on first location information for the UE and second location information for one or more other UEs, and communicating based on the second signal approving the request to suspend the beam refinement process at the UE.

An apparatus for wireless communications is described. The apparatus may include a processor, memory coupled with the processor, and instructions stored in the memory. The instructions may be executable by the processor to cause the apparatus to receive a first signal including a request to suspend a beam refinement process at a UE based on a resolution of a phase shifting operation at the UE, transmit a second signal approving the request to suspend the beam refinement process at the UE based on first location information for the UE and second location information for one or more other UEs, and communicate based on the second signal approving the request to suspend the beam refinement process at the UE.

Another apparatus for wireless communications is described. The apparatus may include means for receiving a first signal including a request to suspend a beam refinement process at a UE based on a resolution of a phase shifting operation at the UE, means for transmitting a second signal approving the request to suspend the beam refinement process at the UE based on first location information for the UE and second location information for one or more other UEs, and means for communicating based on the second signal approving the request to suspend the beam refinement process at the UE.

A non-transitory computer-readable medium storing code for wireless communications is described. The code may include instructions executable by a processor to receive a first signal including a request to suspend a beam refinement process at a UE based on a resolution of a phase shifting operation at the UE, transmit a second signal approving the request to suspend the beam refinement process at the UE based on first location information for the UE and second location information for one or more other UEs, and communicate based on the second signal approving the request to suspend the beam refinement process at the UE.

Some examples of the method, apparatuses, and non-transitory computer-readable medium described herein may further include operations, features, means, or instructions for receiving, from a network entity, a third signal indicating at least a portion of the second location information for the one or more other UEs, where the second signal approves the request based on the third signal.

Some examples of the method, apparatuses, and non-transitory computer-readable medium described herein may further include operations, features, means, or instructions for transmitting a fourth signal requesting location information from the UE, the one or more other UEs, the network entity, or a combination thereof, where the second signal approves the request based on the fourth signal requesting the location information.

Some examples of the method, apparatuses, and non-transitory computer-readable medium described herein may further include operations, features, means, or instructions for determining a direction of interference from the UE based on the request to suspend the beam refinement process at the UE, where the second signal approves the request to suspend the beam refinement process at the UE based on the direction of interference and the second location information for the one or more other UEs.

Some examples of the method, apparatuses, and non-transitory computer-readable medium described herein may further include operations, features, means, or instructions for receiving a third signal including a second request to suspend a second beam refinement process at a second UE and transmitting a fourth signal denying the second request to suspend the second beam refinement process at the second UE based on third location information for the second UE and the second location information for the one or more other UEs.

Some examples of the method, apparatuses, and non-transitory computer-readable medium described herein may further include operations, features, means, or instructions for receiving a third signal including a second request to activate the beam refinement process at the UE and transmitting a fourth signal approving the second request to activate the beam refinement process at the UE based on the first location information for the UE and the second location information for the one or more other UEs.

DETAILED DESCRIPTION

Figure 1:
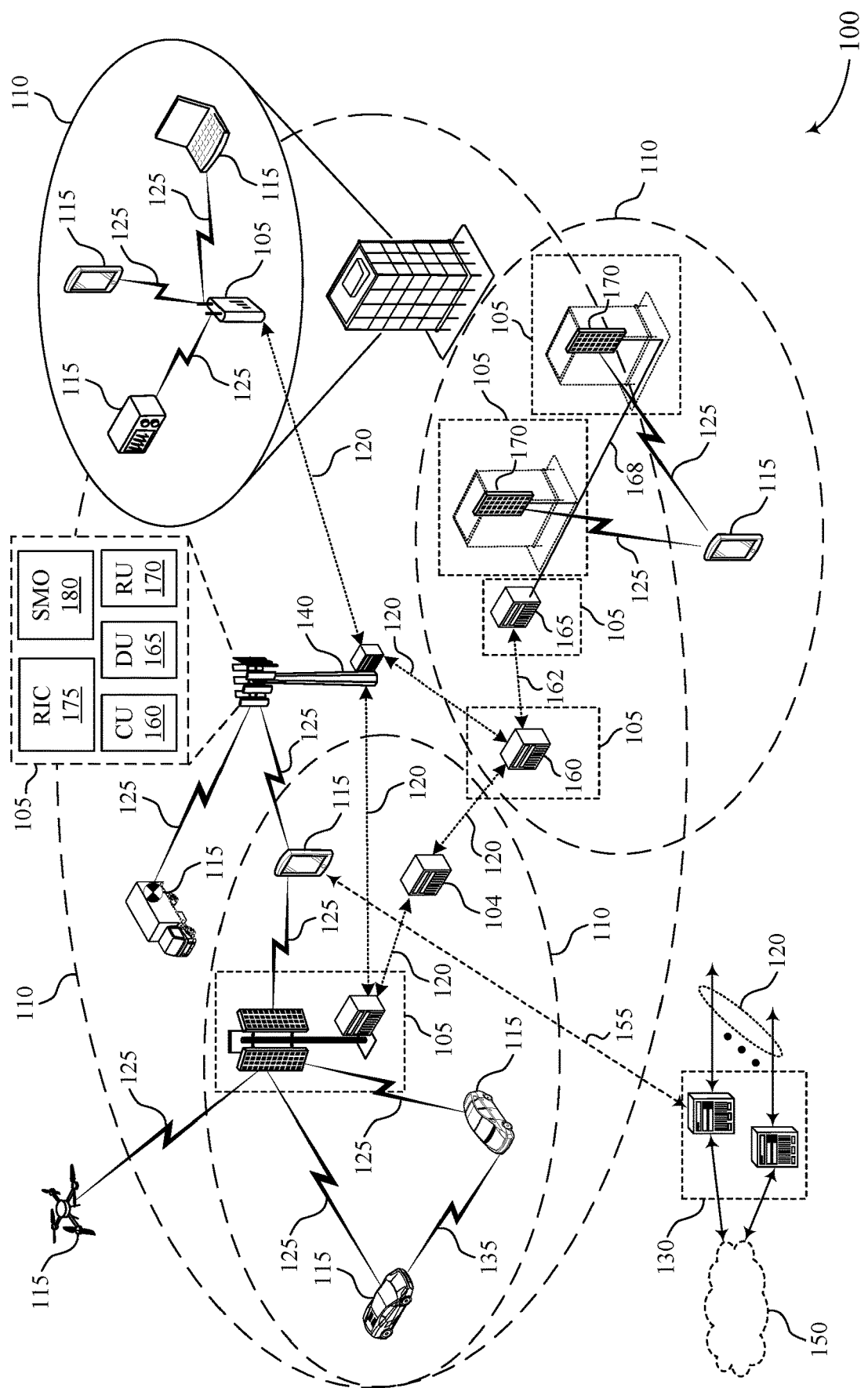
FIGS. 1 and 2 illustrate examples of wireless communications systems that support techniques for managing low or variable phase shift resolutions in beam-based communications in accordance with one or more aspects of the present disclosure.

In some systems, a user equipment (UE) may use millimeter wave (mmW) frequencies with beamforming to communicate with a network entity. A beam used at mmW frequencies may be an example of a directional beam effectively aiming signal transmission or reception in a specific direction. The UE may transmit a signal (e.g., a waveform), receive a signal, or both via the beamforming procedure. This signal (e.g., a beam-based communication) may include multiple "lobes," or local peaks in the array gain for the signal, including a main lobe (e.g., corresponding to the greatest array gain) in the direction of the beam and multiple side lobes (e.g., corresponding to relatively lower array gains) in other directions based on a radiation pattern of the UE's antenna array. The UE may use a phase shifter with an associated phase resolution corresponding to a specific quantity of bits to adjust the phase of each antenna element to construct the set of beam weights for a beam-based communication. For example, the UE may use a high-resolution phase shifter (e.g., a phase shifter using greater than a threshold quantity of bits to indicate the phase value) to generate a relatively narrower beam with a relatively higher gain than a low-resolution phase shifter (e.g., a phase shifter using smaller than a threshold quantity of bits to indicate the phase value).

Additionally, or alternatively, the UE may use the high-resolution phase shifter to reduce the gain of one or more side lobes associated with the beam. In some examples, the use of a high-resolution phase shifter may lead to an increase in power consumption and processing overhead at the UE. To reduce the power consumption and processing overhead, the UE may use a low-resolution phase shifter (e.g., a phase shifter with a relatively lower resolution than the high-resolution phase shifter) to generate and steer the beams. However, the use of a low-resolution phase shifter may increase the gain of one or more side lobes of the beam enough to satisfy a gain threshold. In some cases, such side lobes (e.g., a side lobe satisfying the gain threshold) may potentially interfere with communications between other devices in the wireless communications system (e.g., between the network entity and one or more other UEs), resulting in increased latency, degraded channel quality, and poor user experience for other UEs, network entities, or both in the wireless communications system.

The techniques described herein may enable a UE to dynamically update the resolution of a phase shifter at the UE. For example, in some cases, the UE may be configured with a variable-resolution phase shifter, which may support both high-resolution phase shifting operations (e.g., five-bit resolution phase shifting) and low-resolution phase shifting operations (e.g., two-bit resolution phase shifting). The UE may select a supported resolution for performing phase shifting operations using the variable-resolution phase shifter. In some other cases, the UE may be configured with both a high-resolution phase shifter and a low-resolution phase shifter (e.g., with a relatively lower resolution than the high-resolution phase shifter), and the UE may select which phase shifter to use for phase shifting operations.

The UE may operate according to a first phase shifting resolution, but the UE may support a second phase shifting resolution (e.g., with the same or a different phase shifter) that is relatively lower than the first phase shifting resolution. For example, if the UE has a phase shifter that supports multiple different resolutions, the UE may update the phase shifting resolution within the phase shifter by activating a relatively larger or relatively smaller part of the radio frequency (RF) circuitry that enables the phase shifting operation. If the phase shifting resolution is updated with different phase shifters, the UE may activate different physical circuitries to activate either a first phase shifter or a second, separate phase shifter. The UE may transmit, to a network entity, a request to switch to a relatively lower resolution phase shifter (e.g., the same phase shifter or a different phase shifter), where the request may indicate power saving metrics associated with operating the lower resolution phase shifter, side lobe gain information associated with the lower resolution phase shifter, or a combination thereof. The network entity may receive the request and may determine interference metrics associated with the UE operating using the lower resolution phase shifter based on the channel environment (e.g., a quantity of UEs operating in the area, objects that correspond to reflectors or diffractors relative to the different UEs operating in the area, reports from other UEs, or other aspects of the channel environment). The network entity may transmit control signaling to the UE indicating whether the UE may use the lower resolution phase shifter based on the reported interference metrics, the power saving metrics, or both. If the network entity approves the switch, the UE may communicate with the network entity using beam weights generated using the lower resolution phase shifter, effectively saving power at the UE. Additionally, or alternatively, the network entity may reduce or otherwise mitigate interference in the wireless communications system caused by beam weights generated using the lower resolution phase shifter based on monitoring the channel environment. For example, the network entity may approve the switch to the lower resolution phase shifter if additional interference caused by the lower resolution phase shifter may not affect (or may negligibly affect) other devices in the wireless communications system.

Additionally, or alternatively, to mitigate potential negative effects of beam weights generated using low-resolution phase shifters (e.g., to reduce side lobe gains, to reduce a gain difference between the main lobe and the side lobes for a beam), the UE may dynamically suspend or activate a beam refinement procedure. In some examples, the UE may request to suspend or activate the beam refinement procedure based on one or more interference metrics for beams. For example, the UE may determine a beam for a next step in a beam refinement process (e.g., for the low-resolution phase shifter) and may determine whether predicted interference from the beam satisfies a gain threshold.

The UE may transmit a request message to the network entity indicating the activation or suspension of a beam refinement procedure based on the predicted interference (e.g., based on gain information for the main lobe of the beam, for one or more side lobes of the beam, or both). In response to the request message, the network entity may indicate to the UE whether the UE is approved or denied for using the beam refinement procedure based on one or more interference metrics. In some examples, the network entity may determine that a beam refinement procedure is supported and may indicate the determination to the UE (e.g., denying a request from the UE to suspend beam refinement or approving a request from the UE to activate beam refinement). In some other examples, the network entity may approve a request from the UE to suspend beam refinement or may deny a request from the UE to activate beam refinement. Thus, the network entity may determine if beam refinement at the UE may be used based on interference metrics, thereby reducing or otherwise mitigating potentially negative effects (e.g., beam-based interference) of using a low-resolution phase shifter. Reducing such potentially negative effects may increase communication quality, improve latency, and reduce interference in the wireless communications system.

Aspects of the disclosure are initially described in the context of wireless communications systems. Aspects of the disclosure are further illustrated in the context of a beam refinement diagram and process flows. Aspects of the disclosure are further illustrated by and described with reference to apparatus diagrams, system diagrams, and flowcharts that relate to techniques for managing low or variable phase shift resolutions in beam-based communications.

FIG. 1 illustrates an example of a wireless communications system 100 that supports techniques for managing low or variable phase shift resolutions in beam-based communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for managing low or variable phase shift resolutions in beam-based communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications.

The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples of the wireless communications system 100, a UE 115 may use beamforming techniques to communicate with a network entity 105. For example, the UE 115 may use specific phase and amplitude weights in radio frequency (RF), intermediate frequency (IF), and local oscillator (LO) components of the UE 115 to steer energy in one or more directions. In some examples, the UE 115 may use a phase shifter to set a phase value across antenna elements. In some such examples, phase shifters may consume a small amount of power, relative to the RF chain, at frequencies greater than or equal to mmW frequencies. Phase shifters may consume a relatively larger fraction of the power on a receiving path than on a transmitting path. That is, the phase shifter at the UE 115 may consume relatively more power receiving signaling than transmitting signaling because the bandwidth of receiving components at the UE 115 (e.g., low noise amplifiers (LNAs)) may be greater than the bandwidth of transmitting components at the UE 115 (e.g., power amplifiers (PAs)) in systems affording ultra-wide bandwidth coverage (e.g., greater than 10 GHz, such as frequencies in Frequency Range 4 (FR4)). Thus, the UE 115 may use more antenna elements in the receiving path than the transmitting path. Further, in some cases, the UE 115 may consume relatively more power associated with phase shifters as communications at mmW frequencies increase.

The precision (e.g., resolution) of the phase shifter at the UE 115 may affect the main lobe gain (e.g., peak antenna array gain) for a beam-based communication, in addition to influencing the gain of one or more side lobes of the main lobe. In some cases, low-resolution phase shifters may allow the UE 115 to steer the main lobe in a similar manner, or within acceptable performance thresholds, as steering the main lobe with high-resolution phase shifters (e.g., relatively higher resolution phase shifters than the low-resolution phase shifters). However, low-resolution phase shifters may lead to relatively higher side lobe gains than those generated by a high-resolution phase shifter. Thus, a low-resolution phase shifter, such as a two-bit phase shifter (using 0, 90, 180, or 270 degrees as nominal phase values in an illustrative example), may be used to save power, reduce the chipset area used by the phase shifter, or both as compared to a high-resolution phase shifter, but may cause relatively more interference (e.g., based on side lobe array gains) than the high-resolution phase shifter.

For example, a UE 115 may be configured with a 4×2 antenna array for which a beam codebook of size four is designed to cover plus or minus 45 degrees around the boresight direction of the antenna array. The UE 115 may use four beams to steer energy towards uniformly partitioned angles in the plus or minus 45 degree range. The side lobe gain difference (e.g., smallest gap between the main lobe antenna array gain and a side lobe antenna array gain) may be smaller (e.g., based on the side lobe gain being greater) for beams generated using a low-resolution phase shifter than for those generated using a high-resolution phase shifter. In some cases, a UE 115 may use a side lobe gain difference threshold of 13.2 decibels (dB) to determine beams with acceptable side lobe gain differences. However, in some examples, a beam for a low-resolution phase shifter may have a side lobe gain difference of approximately 5 dB, which may fail to satisfy the side lobe gain difference threshold. For one or more beams, the side lobe gain difference may be relatively greater if a UE 115 uses a low-resolution phase shifter as compared to a high-resolution phase shifter. However, there may not be a deterministic pattern in terms of which beams may incur greater side lobe gain differences when using a low-resolution phase shifter.

Additionally, or alternatively, the main lobe (e.g., gain and steering direction) for a beam generated using a low-resolution phase shifter may appear distorted (e.g., within acceptable limits) compared to a beam generated using a high-resolution phase shifter. However, distortion of the main lobe may decrease (e.g., become negligible) if the phase shifting resolution of the UE 115 increases.

Additionally, the UE 115 may use discrete Fourier transform (DFT) beam weights in mmW systems for directional energy steering. Such beam weights may have predictable beam properties such as peak array gain (e.g., calculated using $10 \log_{10}(N)$ dB) corresponding to the main lobe of the beam, a first side lobe gain difference (e.g., the delta between the main lobe and peak side lobe antenna gains) of approximately 13.2 dB, and 3 dB beamwidth of the main lobe (e.g., of approximately 102/N degrees), where N is the array dimension (e.g., for the UE's antenna array). Such predictable beam properties may be based on a phase shifter that assumes infinite-bit precision or a relatively large phase resolution. However, a UE 115 may include a phase shifter (e.g., a chipset configured with a phase shifter) that has a B-bit phase resolution, where B is equal to three or more bits (or 5 or more bits). Such a phase shifter (e.g., a 3-bit phase shifter, a 5-bit phase shifter) may be an example of a high-resolution phase shifter. In some cases, however, phase shifters may be of low complexity or low resolution. A low-resolution phase shifter may consume relatively less power, consume relatively less area on the chipset, or both, which may improve UE power savings and reduce production costs for an original equipment manufacturer (OEM). For example, a two-bit (e.g., B=2) phase shifter may use I or Q signals (e.g., sinusoidal waves that may be separated by a relative phase shift of 90 degrees) given that the beam weights are 1, i, −1, and −i. A three-bit (e.g., B=3) phase shifter may use both I and Q signals. In some systems, low-resolution phase shifters (e.g., B=2) may be used for IoT applications, NR-light applications, or both to reduce the production costs of the UEs 115, the power consumptions of the UEs 115, or both. In some systems (e.g., 5G systems), a UE 115 may be designed with a Wi-Fi chipset with a two-bit phase shifting resolution (e.g., B=2) to support Wi-Fi communications. It is to be understood that other UEs 115 may be configured with low-resolution phase shifters, high-resolution phase shifters, variable-resolution phase shifters (e.g., phase shifters that may dynamically change resolution), or any combination thereof to support other systems, applications, or communications.

The impact of low-resolution phase shifters on the performance of beam codebooks may be deterministic, but relatively complex (e.g., non-formulaic). For example, as described herein, a UE 115 may use a 4×2 antenna array to cover plus or minus 45 degrees and may steer four beams uniformly. Alternatively, a UE 115 may use an 8×2 antenna array to cover the same plus or minus 45 degrees and may steer eight beams uniformly. In both cases, the difference in the side lobe gain compared to the main lobe gain of the generated beams may be based on the bit resolution of the phase shifter (e.g., based on the value, B). In some examples, if the phase shifter has a relatively low resolution (e.g., B=2), the side lobe gains may increase in unpredictable ways. Specifically, for many beams, the side lobe gain may increase as the bit resolution (e.g., B) decreases. Additionally, there may be no deterministic pattern in terms of which beams may incur greater side lobe gains as the bit resolution decreases. Further, the main lobe (e.g., the gain, the precision of the steering direction) may degrade as the resolution of the phase shifter decreases.

Accordingly, based on the UE 115 configuration (e.g., the configured phase shifter precision or resolution), the side lobe array gains for specific beams may be considerably higher than other beams, which may increase network-level interference if the UE 115 transmits or receives using the specific beams. That is, the uplink interference caused by using a low-resolution phase shifter may be beam-dependent, for example, independent of which level in beam refinement hierarchy the beams belong. For example, at a stage in beam refinement, the UE 115 may select a beam from a set of multiple beam options, where the different beam options at this stage of beam refinement may cause different amounts of interference based on different side lobe gain differences. In contrast, side lobes generated by a high-resolution phase shifter may be relatively more predictable, thereby making the interference caused by such side lobes predictable. Accordingly, using a low-resolution phase shifter (instead of a high-resolution phase shifter) may increase interference in the network, thereby reducing communication quality and increasing latency in the wireless communications system.

To improve phase shifting operations, a network entity 105 may dynamically configure the resolution of a phase shifter at a UE 115. In some cases, the UE 115 may be configured with a variable-resolution phase shifter, which may include a high-resolution (e.g., five-bit resolution) phase shifter, but may have the ability to operate using a limited resolution of the phase shifter (e.g., use two out of the five bits of resolution). In some other cases, the UE 115 may be configured with both a high-resolution phase shifter and a low-resolution phase shifter (e.g., relative to the high-resolution phase shifter). The UE 115 may transmit to the network entity 105, a request to switch to a lower resolution phase shifter. In some examples, the request may indicate power saving metrics associated with operating a lower resolution phase shifter, side lobe gain information associated with a lower resolution phase shifter, or combination thereof. The network entity 105 may determine interference metrics associated with the UE 115 operating a lower resolution phase shifter based on a channel environment (e.g., a quantity of UEs 115 operating in proximity to the UE 115, the type of environment in which the UE 115 is operating, reports from other UEs 115). The network entity 105 may transmit control signaling to the UE 115 indicating whether the UE 115 may use the low resolution phase shifter based on the interference metrics, the received power saving metrics, or both. In some cases, if the network entity 105 approves the switch, the UE 115 may communicate with the network entity 105 using a low resolution phase shifter, thereby saving power at the UE 115. Additionally, or alternatively, the network entity 105 may reduce the interference in the wireless communications system 100 caused by beams generated by the UE 115 using the lower resolution phase shifter based on monitoring the channel environment and approving the shift to the lower resolution if the shift does not cause significant interference to other devices in the environment. In some cases, the UE 115 may increase the phase resolution of the phase shifter to improve performance in communications with the network entity 105 based on interference metrics.

To mitigate some effects of beams generated using low-resolution phase shifters (e.g., to reduce side lobe gains, reduce interference), the UE 115 may dynamically suspend a beam refinement procedure. In some examples, the UE 115 may request to suspend the beam refinement procedure based on one or more interference metrics for beams. For example, the UE 115 may determine a beam for a next step in beam refinement (e.g., for a low-resolution phase shifter) and may determine whether the resulting gain of the side lobes for the beam is above a gain threshold (or the side lobe gain difference is above a side lobe gain difference threshold). The UE 115 may transmit a request message to the network entity 105 requesting the suspension of the beam refinement procedure, for example, based on the gain of the side lobes. In response to the request message, the network entity 105 may indicate to the UE 115 whether the UE 115 may suspend the beam refinement procedure based on one or more interference metrics. In some examples, the network entity 105 may determine that a beam refinement procedure is supported and may deny the request from the UE 115 to suspend beam refinement. In some other examples, the network entity 105 may determine that the beam refinement procedure may cause interference in the system and may approve the request from the UE 115 to suspend beam refinement. Thus, the network entity 105 may determine if beam refinement at the UE 115 may be used based on interference metrics, thereby potentially reducing negative effects (e.g., side lobe array gain, interference) of using a low-resolution phase shifter. Reducing the effects of using the low-resolution phase shifter may increase communication quality, improve latency, and reduce interference for the wireless communications system 100.

Figure 2:
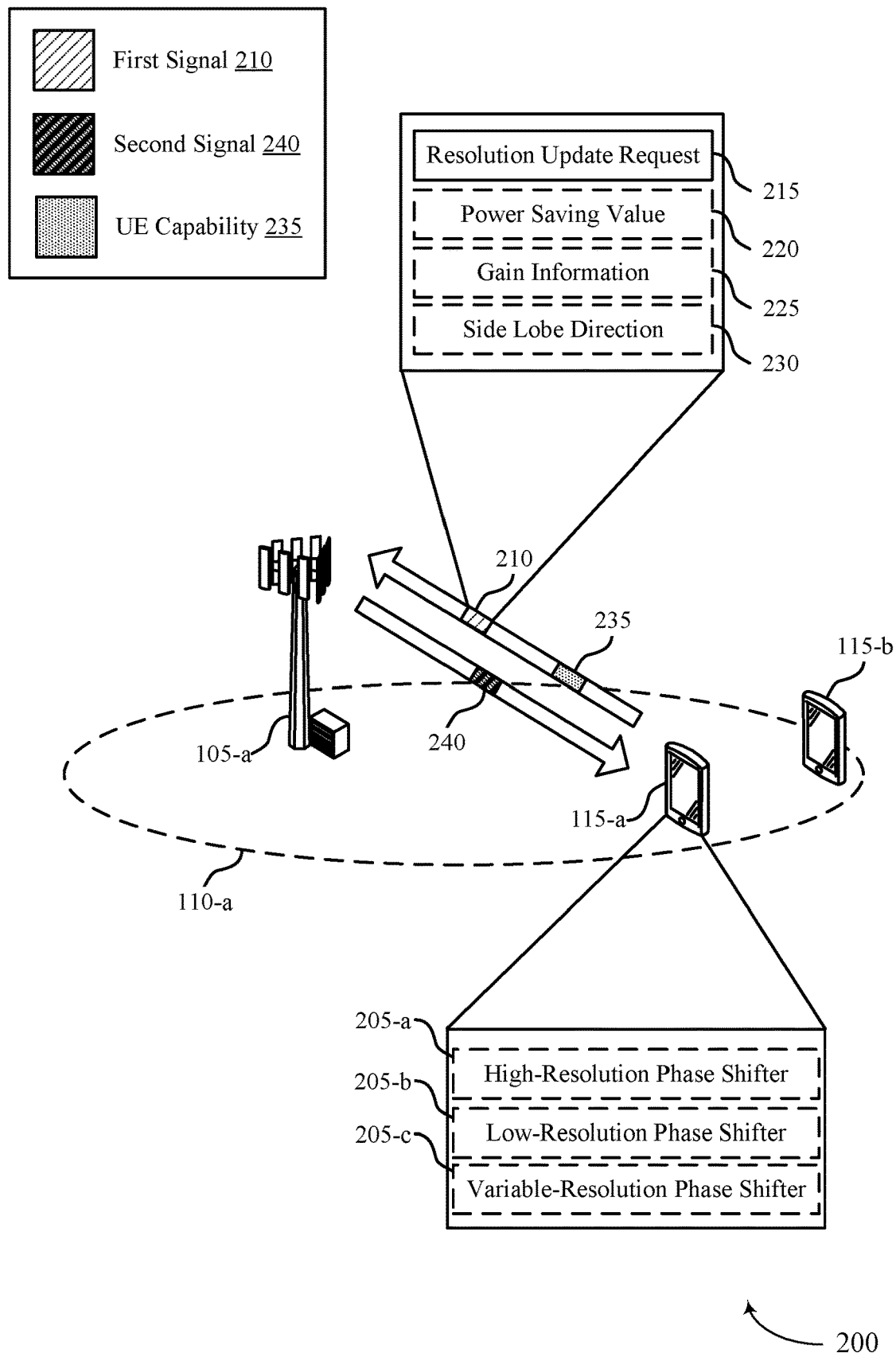

FIG. 2 illustrates an example of a wireless communications system 200 that supports techniques for managing low or variable phase shift resolutions in beam-based communications in accordance with one or more aspects of the present disclosure. The wireless communications system 200 may implement or be implemented by aspects of a wireless communications system 100 as described with reference to FIG. 1. For example, the wireless communications system 200 may include a network entity 105-a, a UE 115-a, and a UE 115-b, which may be examples of the corresponding devices described herein with reference to FIG. 1. Additionally, the network entity 105-a, the UE 115-a, and the UE 115-b may be within a coverage area 110-a, which may be an example of a coverage area 110 as described herein with reference to FIG. 1. The wireless communications system 200 may support a UE 115 (e.g., the UE 115-a) switching a phase shifting resolution, for example, to conserve energy at the UE 115.

In some examples, the UE 115-a and the UE 115-b may communicate with the network entity 105-a using one or more beams. For example, the UE 115-a may generate one or more beams for communications with the network entity 105-a using phase and amplitude weights applied to antenna arrays. To generate the phase weights, the UE 115-a may use one or more phase shifters. For example, the UE 115-a may use a high-resolution phase shifter 205-a to generate one or more beams to communicate with the network entity 105-a. In such examples, the use of the high-resolution phase shifter 205-a may involve significant power consumption at the UE 115-a (e.g., above a power consumption threshold). To reduce power consumption at the UE 115-a, the UE 115-a may use a low-resolution phase shifter 205-b to communicate with the network entity 105-a. For example, the low-resolution phase shifter 205-b may use less power (and cover less area on a chip) for the UE 115-a than the high-resolution phase shifter 205-a, thereby reducing power consumption at the UE 115-a.

However, one or more side lobes of a beam generated using a low-resolution phase shifter 205-b may be enhanced (e.g., have an increased gain), which may cause increased interference in the wireless communications system 200 (e.g., as compared to beams generated using the high-resolution phase shifter 205-a). For example, the UE 115-a may generate a beam using the low-resolution phase shifter 205-b, which may increase the gain of one or more side lobes of the beam, thereby reducing the difference between the main lobe gain and the side lobe gain such that the difference fails to satisfy a gain threshold. In some examples, the UE 115-a may transmit one or more uplink messages to the network entity 105-a using the generated beam during a time when the network entity 105-a is transmitting one or more downlink messages to UE 115-b. In such examples, the one or more enhanced side lobes may interfere with the downlink communications between the network entity 105-a and the UE 115-b, resulting in increased latency and degraded communications for the UE 115-b. Such interference may occur more frequently based on the conditions of the wireless communications system 200. For example, interference may increase in densified networks (e.g., systems with multiple network entities 105 communicating with multiple UEs 115) where beams may not be coordinated (e.g., to reduce impairments or at cell-edge settings). Alternatively, in a relatively less densified network, or in cases that the network entity 105-a coordinates beams, interference due to side lobes (e.g., even at increased levels) may not cause significant degradations of communications based on the network entity 105-a coordinating beams and communications for multiple UEs 115.

The network entity 105-a may dynamically configure the resolution of one or more phase shifters at the UE 115-a based on one or more interference metrics, the network environment (e.g., channel environment), or both. For example, the UE 115-a may transmit a first signal 210 to the network entity 105-a, where the first signal 210 may be an example of uplink control information (UCI), a medium access control (MAC) control element (MAC-CE), or a radio resource control (RRC) signal. The first signal 210 may include a request to update the phase shifter resolution 215 at the UE 115-a, a power saving value 220, gain information 225, a side lobe direction 230, or a combination thereof. The request to update the phase shifter resolution 215 may request to decrease the phase shifter resolution, increase the phase shifter resolution, configure the phase shifter to operate according to a specific resolution, or some combination thereof. The power saving value 220 may indicate an amount of power saved (or predicted to be saved) at the UE 115-a based on reducing the resolution of phase shifting (e.g., if the UE 115-a performs the update to the phase shifter resolution). The gain information 225 may indicate the difference between the gain of the main lobe and the gain of the side lobe of the beam generated for the updated phase shifting resolution. The side lobe direction 230 may indicate the direction of one or more side lobes of the beam (e.g., the side lobe with the greatest array gain). The first signal 210 may be an example of a control message including bit fields for the request to update the phase shifter resolution 215, the power saving value 220, the gain information 225, the side lobe direction 230, or a combination thereof. In some examples, the UE 115-a may determine and store the power saving value 220, the gain information 225, the side lobe direction 230, or some combination thereof in a lookup table. For example, these values may be predetermined (e.g., based on offline testing) and stored in the lookup table to support the request to update the phase shifter resolution 215. The UE 115-a may transmit the first signal 210, including the request to update the phase shifter resolution 215, based on the values stored in the lookup table. Additionally, in some examples, the UE 115-a may transmit UE capability information 235 to the network entity 105-*a* indicating an ability of the UE 115-*a* to update the phase shifter resolution (e.g., based on the UE 115-*a* having both a high-resolution phase shifter 205-*a* and a low-resolution phase shifter 205-*b*, or based on the UE 115-*a* having a variable-resolution phase shifter 205-*c*).

The network entity 105-*a* may transmit a second signal 240 indicating approval or denial of the request to update the phase shifter resolution 215 based on the information received via the first signal 210, interference metrics, or both. In some examples, the network entity 105-*a* may determine directional interference metrics based on reports of interference from one or more other UEs 115 within the cell (e.g., the UE 115-*b*), reports of location information from one or more other UEs 115 within the cell, reports of UE location information or interference coordination from one or more other network entities 105 across multiple cells (e.g., via an X2 interface), or any combination thereof. The network entity 105-*a* may compare the received side lobe direction 230 with the received location reports from various devices and may transmit the second signal 240 approving or denying the request based on whether interference may occur. For example, if another UE 115 (e.g., the UE 115-*b*) is within a threshold distance of the UE 115-*a* in the direction of the side lobe direction 230, the network entity 105-*a* may deny the request to update the phase shifter resolution 215 based on the update potentially causing interference (e.g., additional interference satisfying an interference threshold) to the UE 115-*b*. In some other examples, the network entity 105-*a* may transmit the second signal 240 approving or denying the request to update the phase shifter resolution 215 based on the channel environment (e.g., urban environment, rural environment, sparse usage). For example, in relatively dense environments, the network entity 105-*a* may deny requests to lower a phase shifter resolution, but in relatively sparse environments (e.g., with relatively few UEs 115), the network entity 105-*a* may accept requests to lower a phase shifter resolution.

Additionally, or alternatively, the network entity 105-*a* may transmit the second signal 240 approving or denying the request to update the phase shifter resolution 215 based on the power saving value 220, the gain information 225, or both. In some examples, the second signal 240 may be downlink control information (DCI), a MAC-CE, an RRC signal, or a combination thereof. That is, the network entity 105-*a* may determine whether the power saving value 220 satisfies a power saving threshold and may transmit the second signal 240 based on the determining. For example, the network entity 105-*a* may approve the update to a relatively lower resolution phase shifter to support power savings at the UE 115-*a* according to the power saving value 220. In some examples, the network entity 105-*a* may determine whether the gain information 225 satisfies a gain threshold (e.g., the difference between the gain of the main lobe and the gain of the side lobe is greater than or equal to the gain threshold) and may transmit the second signal 240 based on the determining. For example, if the gain information 225 indicates that the difference in gain between the main lobe and side lobe is relatively large enough to mitigate interference from the side lobe, the network entity 105-*a* may approve the update to the relatively lower resolution phase shifter. Thus, the network entity 105-*a* may approve or deny the request to update the phase shifter resolution 215 based on interference metrics, channel environment, power saving values 220, gain information 225, or a combination thereof.

If the network entity 105-*a* approves the request to update the phase shifter resolution 215, the UE 115-*a* may shift from using the high-resolution phase shifter 205-*a* to using the low-resolution phase shifter 205-*b*. Additionally, or alternatively, the UE 115-*a* may be configured with a variable-resolution phase shifter 205-*c*. The variable-resolution phase shifter 205-*c* may be designed with one or more phase shifters or the capability to refrain from performing one or more steps of a phase shifting operation. For example, the variable-resolution phase shifter 205-*c* may be configured with a fixed set of components supporting high-resolution phase shifting, but from which the UE 115-*a* may perform a subset of phase shifting operations in accordance with low-resolution phase shifting. The UE 115-*a* may reduce the bits used in the variable-resolution phase shifter 205-*c* from a relatively higher quantity of bits (e.g., supporting high-resolution phase shifting) to a relatively lower quantity of bits (e.g., supporting low-resolution phase shifting). The UE 115-*a* may select the quantity of bits to use for phase shifting operations at the variable-resolution phase shifter 205-*c* based on receiving the approval from the network entity 105-*a*. Thus, the UE 115-*a* may update the phase shifting resolution based on network approval, thereby reducing power consumption at the UE 115-*a*, extending battery life, and improving user experience (e.g., while maintaining coordination with the network).

If the network entity 105-*a* denies the request to update the phase shifter resolution 215, the UE 115-*a* may refrain from lowering the resolution and may maintain the current phase shifter resolution. Thus, the network entity 105-*a* may reduce interference in the wireless communications system 200 by denying the request, resulting in improved communication quality and reduced latency.

Figure 3:
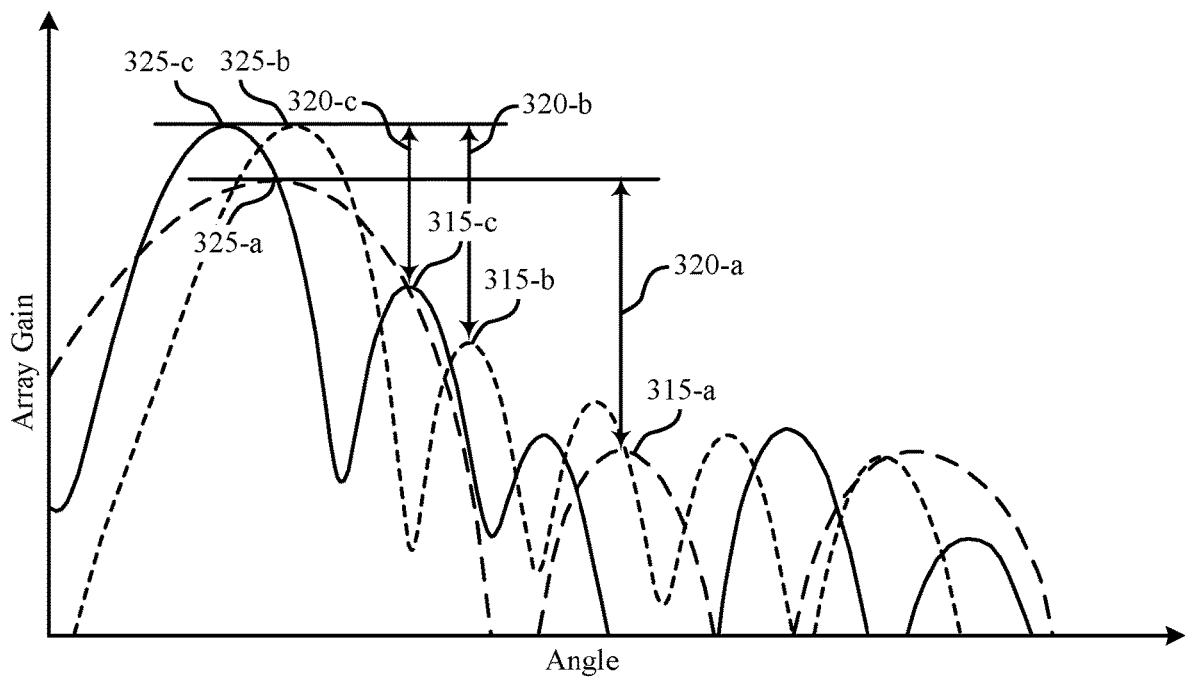
FIG. 3 illustrates an example of a beam refinement process that supports techniques for managing low or variable phase shift resolutions in beam-based communications in accordance with one or more aspects of the present disclosure.

FIG. 3 illustrates an example of a beam refinement process 300 that supports techniques for managing low or variable phase shift resolutions in beam-based communications in accordance with one or more aspects of the present disclosure. The beam refinement process 300 may be implemented by aspects of the wireless communications system 100 or the wireless communications system 200 described herein with reference to FIGS. 1 and 2. For example, the beam refinement process 300 may represent lobes of beams generated by a UE 115, which may be an example of a UE 115 as described herein. The beam refinement process 300 may provide an example of a step in a beam refinement procedure that may result in additional interference based on the characteristics of the lobes.

In some examples, a UE 115 may use a hierarchical procedure to generate one or more beams for communications with a network entity 105. For example, the UE 115 may generate a first beam 305 (e.g., P1 beam) using a phase shifter. As described herein, the first beam 305 may have a relatively wide main lobe 325-*a* and relatively wide side lobes, such as a first side lobe 315-*a*. The first beam 305 may correspond to a relatively wide beamwidth, such that the UE 115 may communicate using the first beam 305 (e.g., receive signaling, transmit signaling, or both) for a relatively wide range of directions. For example, the first beam 305 may support communications with devices that are located within a 90 degree arc from the UE 115. However, the first beam 305 may result in a relatively lower array gain in specific directions within this 90 degree arc than more refined beams (e.g., a beam 310-*a* or a beam 310-*b*).

In some cases, the UE 115 may perform a beam refinement procedure to select the beam 310-*a* or the beam 310-*b* (e.g., P3 beams) for communications. The UE 115 may perform the beam refinement procedure to communicate via a beam that supports a relatively higher array gain in a relatively narrower direction (e.g., for the main lobe) based on a relatively narrower beamwidth. Such beam refinement may increase the energy of the beam as well as focus the beam in a selected direction, potentially leading to increased communication quality. For example, the UE 115 may receive one or more channel state information (CSI) reference signals (CSI-RS) to perform the beam refinement process. Based on measuring one or more received CSI-RSs, the UE 115 may refine the beam 305 to a relatively narrower beam, such as the beam 310-*a*.

However, the beam refinement procedure may potentially lead to an increase in gains for side lobes of a beam, such as the beam 310-*a* or the beam 310-*b*. As an illustrative example, the beam 305 may have a main lobe 325-*a* with a gain of 9 dB and a first side lobe 315-*a* with a gain of −2.3 dB. Thus, the difference 320-*a* between the main lobe gain and the side lobe gain may be 11.3 dB (e.g., the delta between main lobe gain and side lobe gain). A difference of 11.3 dB may be an acceptable difference, such that interference from the side lobe 315-*a* may be negligible (e.g., compared to the main lobe 325-*a*) if a UE 115 uses the beam 305 for communications. However, following the beam refinement procedure, the beam 310-*a* may have a main lobe 325-*b* with a gain of 11.25 dB, but a side lobe 315-*b* with a gain of 2.25 dB. Thus, the difference 320-*b* between the main lobe gain and side lobe gain may be 9 dB for the beam 310-*a*, which may increase interference caused by the side lobe 315-*b* (e.g., relative to the main lobe 325-*b*) in a wireless communications system. Likewise, the beam 310-*b* may have a main lobe 325-*c* with a gain of 11.3 dB and a side lobe 315-*c* with a gain of 5.3 dB. Thus, the difference 320-*c* between the main lobe gain and the side lobe gain may be 6 dB, which may also increase interference in the wireless communications system. Even though the beam refinement may increase the array gain of the main lobe of a beam, a relatively greater increase to the array gain of one or more side lobes of the beam may cause additional interference in the system (e.g., in specific directions corresponding to side lobes).

In some cases, a UE 115 operating using a low-resolution phase shifter may experience greater interference from side lobes (e.g., as compared to a relatively higher resolution phase shifter). For example, relatively fewer steps in a phase shifting operation may result in enhanced side lobes, decreasing the difference between the main lobe gain and the side lobe gain for beams. In some examples, beam refinement procedures for a low-resolution phase shifter may cause interference exceeding an interference threshold, while similar beam refinement procedures for a high-resolution phase shifter may fail to cause interference exceeding the interference threshold.

In some examples, the UE 115 may dynamically suspend or activate a beam refinement procedure to reduce interference (e.g., while using a low-resolution phase shifter). For example, the UE 115 may request to suspend or activate the beam refinement procedure based on one or more interference metrics for beams. In some cases, the UE 115 may determine a beam 310-*a* to select for a next step in beam refinement (e.g., to refine the beam 305 based on one or more CSI-RSs) and may determine whether the resulting gain of a side lobe 315-*b* satisfies (e.g., exceeds) a gain threshold. In some other cases, the UE 115 may determine that each beam option for the next step in beam refinement (e.g., both the beam 310-*a* and the beam 310-*b*) has a gain of a side lobe that satisfies the gain threshold. The UE 115 may transmit a request message (e.g., a control signal) to the network entity 105 requesting the suspension of the beam refinement procedure based on the gain of the side lobes. In response to the request message, the network entity 105 may indicate to the UE 115 whether it is acceptable to suspend the beam refinement procedure based on one or more interference metrics. In some examples, the network entity 105 may determine that suspending the beam refinement procedure is supported and may indicate the determination to the UE 115. In some other examples, the network entity 105 may determine that suspending the beam refinement procedure is not supported and may indicate the determination to the UE 115. Thus, the network entity 105 may determine if suspending beam refinement at the UE 115 is supported based on interference metrics, thereby reducing potential negative effects of suspending one or more steps of beam refinement. By supporting the suspension of beam refinement, a UE 115 (e.g., a UE 115 configured with a low-resolution phase shifter) may increase communication quality, improve latency, and reduce interference caused by beam-based communications.

Figure 4:
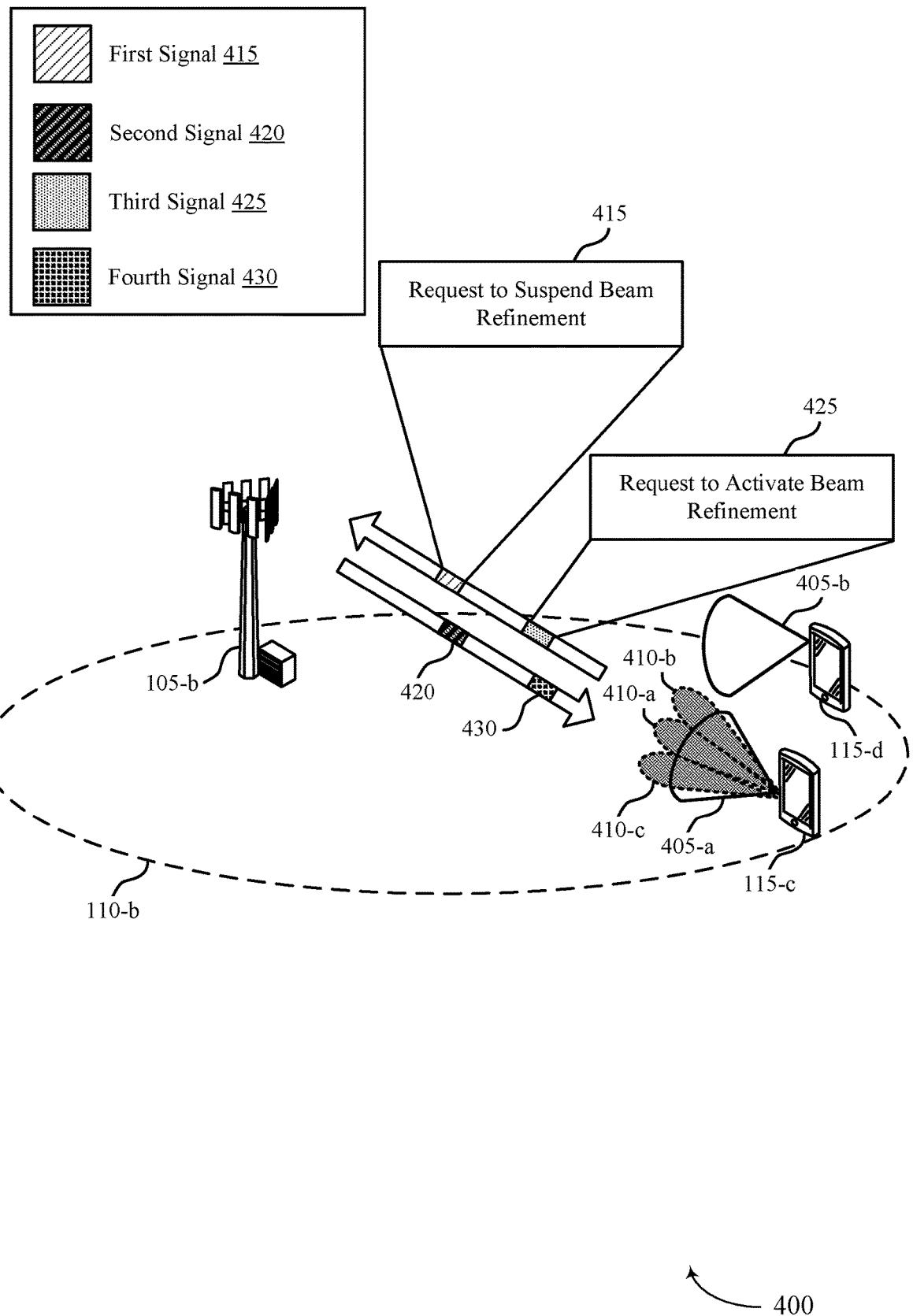
FIG. 4 illustrates an example of a wireless communications system that supports techniques for managing low or variable phase shift resolutions in beam-based communications in accordance with one or more aspects of the present disclosure.

FIG. 4 illustrates an example of a wireless communications system 400 that supports techniques for managing low or variable phase shift resolutions in beam-based communications in accordance with one or more aspects of the present disclosure. The wireless communications system 400 may implement, or be implemented by, aspects of the wireless communications system 100, the wireless communications system 200, the beam refinement process 300, or a combination thereof. For example, the wireless communications system 400 may include a network entity 105-*b*, a UE 115-*c*, and a UE 115-*d*, which may be examples of corresponding devices described herein with reference to FIGS. 1 through 3. Additionally, the network entity 105-*b*, the UE 115-*c*, and the UE 115-*d* may communicate within a coverage area 110-*b*, which may be an example of a coverage area 110 or a coverage area 110-*a* as described herein. A UE 115-*c* may coordinate the suspension or activation of beam refinement processes with the network entity 105-*b*, as described herein with reference to FIG. 3, to improve beam-based communications.

In some examples, the network entity 105-*b* may determine whether a beam 405-*a* at the UE 115-*c* may cause interference (e.g., uplink interference, downlink interference, sidelink interference) at the UE 115-*d*. The network entity 105-*b* may receive interference information (e.g., SNR, signal to interference and noise ratio (SINR)), spectral efficiency reports, or both from UEs 115 (e.g., the UE 115-*d*) via uplink transmissions and may determine whether interference is occurring or may occur. For example, the UE 115-*c* may communicate with the network entity 105-*b* via the beam 405-*a* (e.g., generated using a relatively low-resolution phase shifting process). The UE 115-*c* may perform a beam refinement procedure to increase the gain of the main lobe and narrow the width of the main lobe for the active beam at the UE 115-*c*. However, during communications with the network entity 105-*b*, one or more side lobes of a refined beam 410-*a* may interfere with communications between the network entity 105-*b* and the UE 115-*d*. The UE 115-*d* may transmit an interference report, a spectral efficiency report, or both to the network entity 105-*b* indicating the interference. The network entity 105-*b* may determine that the beam 410-*a* is interfering with the UE 115-*d* (e.g., the UE 115-*d* communicating via a beam 405-*b*) based on the received reports and may transmit an indication to the UE 115-*c* to suspend beam refinement (e.g., communicate using the beam 405-*a* instead of the refined beam 410-*a*). In some cases, such a procedure (e.g., receiving reports, determining interference, transmitting an indication) by the network entity 105-*b* may increase latency in suspending beam refinement. Additionally, or alternatively, the interference reports, spectral efficiency reports, or both may change as the channel environment changes, potentially leading to increased signaling overhead and further latency.

In some systems, the UE 115-c may proactively request suspension or activation of a beam refinement procedure based on interference metrics associated with one or more refined beams (e.g., a refined beam 410-a, a refined beam 410-b, a refined beam 410-c, or a combination thereof), an interference threshold, phase shifter precision, or a combination thereof. In some examples, the network entity 105-b may configure the UE 115-c with the interference threshold at which the UE 115-c may request suspension of the beam refinement procedure. In some examples, the UE 115-c may determine, based on a codebook and one or more antenna properties (e.g., array size, geometry, inter-antenna element spacing, frequency operation, or a combination thereof), in which direction one or more side lobes may cause interference to communications and may request suspension or activation of the beam refinement procedure accordingly. Additionally, or alternatively, the UE 115-c may proactively request the suspension or activation of the beam refinement procedure based on gain information, beam direction information, or other interference metrics associated with the refined beams. By proactively requesting a suspension or activation of beam refinement, the UE 115-c may reduce interference in the wireless communications system 400.

For example, the UE 115-c may communicate with the network entity 105-b using the beam 405-a (e.g., generated using a low-resolution phase shifter). The beam 405-a may include a main lobe and multiple side lobes, as described herein with reference to FIG. 3. In some examples, the UE 115-c may determine that performing a beam refinement procedure on the beam 405-a (e.g., to the refined beam 410-a, the refined beam 410-b, or the refined beam 410-c) may increase the gains of the side lobes for the refined beams, such that the difference between the main lobe and a first side lobe for one or more of the refined beams may be greater than a gain threshold. Additionally, or alternatively, the UE 115-c may determine that the direction of a side lobe for a refined beam may interfere with the communications of the UE 115-d. In some cases, the UE 115-c may determine that a side lobe satisfies the interference threshold configured by the network entity 105-b. Thus, the UE 115-c may transmit a first signal 415 to the network entity 105-b indicating a request to suspend beam refinement. The first signal 415 may include gain information associated with the lobes of a refined beam, a selected beam direction, a location of the UE 115-c, or a combination thereof.

The network entity 105-b may transmit a second signal 420 indicating the approval or denial of the request to suspend the beam refinement procedure based on the received first signal 415. The network entity 105-b may approve or deny the request to suspend beam refinement based on a location of the UE 115-c and the UE 115-d. In some examples, the network entity 105-b may request the location information from the UE 115-c and the UE 115-d. In some other examples, the network entity 105-b may request, and receive, location information associated with the UE 115-d or one or more additional UEs 115 from an additional network entity 105. The network entity 105-b may determine a direction of interference between the UE 115-c, the UE 115-d, one or more additional UEs 115, additional network entities 105, or a combination thereof and may approve or deny the request to suspend beam refinement based on the determining. Additionally, or alternatively, the network entity 105-b may approve or deny the request to suspend beam refinement based on the gain information, the configured interference level, or both. That is, the network entity 105-b may determine whether the gain of a side lobe for a refined beam (e.g., the refined beam 410-a) satisfies a gain threshold, whether the gain difference between a main lobe and the side lobe for the refined beam satisfies a gain threshold, or both. The network entity 105-b may transmit the second signal 420 based on determining whether the refined beam 410-a may cause interference in the wireless communications system 400. In some examples, the second signal 420 may include a one-bit field indicating activation or suspension of the beam refinement procedure (e.g., '1' to activate and '0' to suspend, or vice versa).

If the network entity 105-b approves the request to suspend beam refinement, the UE 115-c may suspend beam refinement for the beam 405-a and may communicate with the network entity 105-b using the beam 405-a (e.g., without further beam refinement). For example, the UE 115-c may perform one or more beam refinement procedures to select the beam 405-a for communications but may refrain from performing further beam refinement procedures based on suspending beam refinement. If the network entity 105-b denies the request to suspend beam refinement (e.g., if the interference caused by the further beam refinement may not affect—or may negligibly affect—other devices in the system), the UE 115-c may perform further beam refinement procedures, such as selecting and communicating with the network entity 105-b via the refined beam 410-a. Thus, the UE 115-c may proactively request suspension of the beam refinement procedure. The network entity 105-b may determine whether the suspension of the beam refinement procedure is approved or denied based on location data, gain information, beam direction, or any other information relating to the system.

In some examples, the UE 115-c may determine that a beam refinement procedure for the beam 405-a may not increase the gains of a side lobe or the difference in gains between the main lobe and the side lobe to exceed a gain threshold for a refined beam. Accordingly, the UE 115-c may determine that performing further beam refinement may not cause interference that satisfies an interference threshold. Additionally, or alternatively, the UE 115-c may determine that the direction of one or more side lobes for a refined beam (e.g., the refined beam 410-a) may not interfere with the communications at the UE 115-d (or other devices). The UE 115-c may transmit a third signal 425 indicating a request to activate the beam refinement procedure (e.g., if the UE 115-c has currently suspended further beam refinement). The third signal 425 may include the gain information, beam direction, location information, or a combination thereof. Based on receiving the third signal 425, the network entity 105-b may transmit a fourth signal 430 approving or denying the request to activate the beam refinement procedure. For example, the network entity 105-b may determine whether the gain information associated with the refined beam 410-a may interfere with the UE 115-d, one or more additional UEs 115, one or more additional network entities 105, or a combination thereof. Based on the determining, the network entity 105-b may transmit the fourth signal 430 approving or denying the request to activate the beam refinement procedure.

If the network entity 105-b approves the request to activate the beam refinement procedure, the UE 115-c may refine the beam 405-a and communicate with the network entity 105-b via the refined beam 410-a. If the network entity 105-b denies the request to activate the beam refinement procedure, the UE 115-c may continue to communicate with the network entity 105-*b* via the beam 405-*a*. Thus, the UE 115-*c* may request the activation of the beam refinement procedure. The network entity 105-*b* may determine whether the activation of the beam refinement procedure may cause interference and may approve or deny the request based on the determination.

Figure 5:
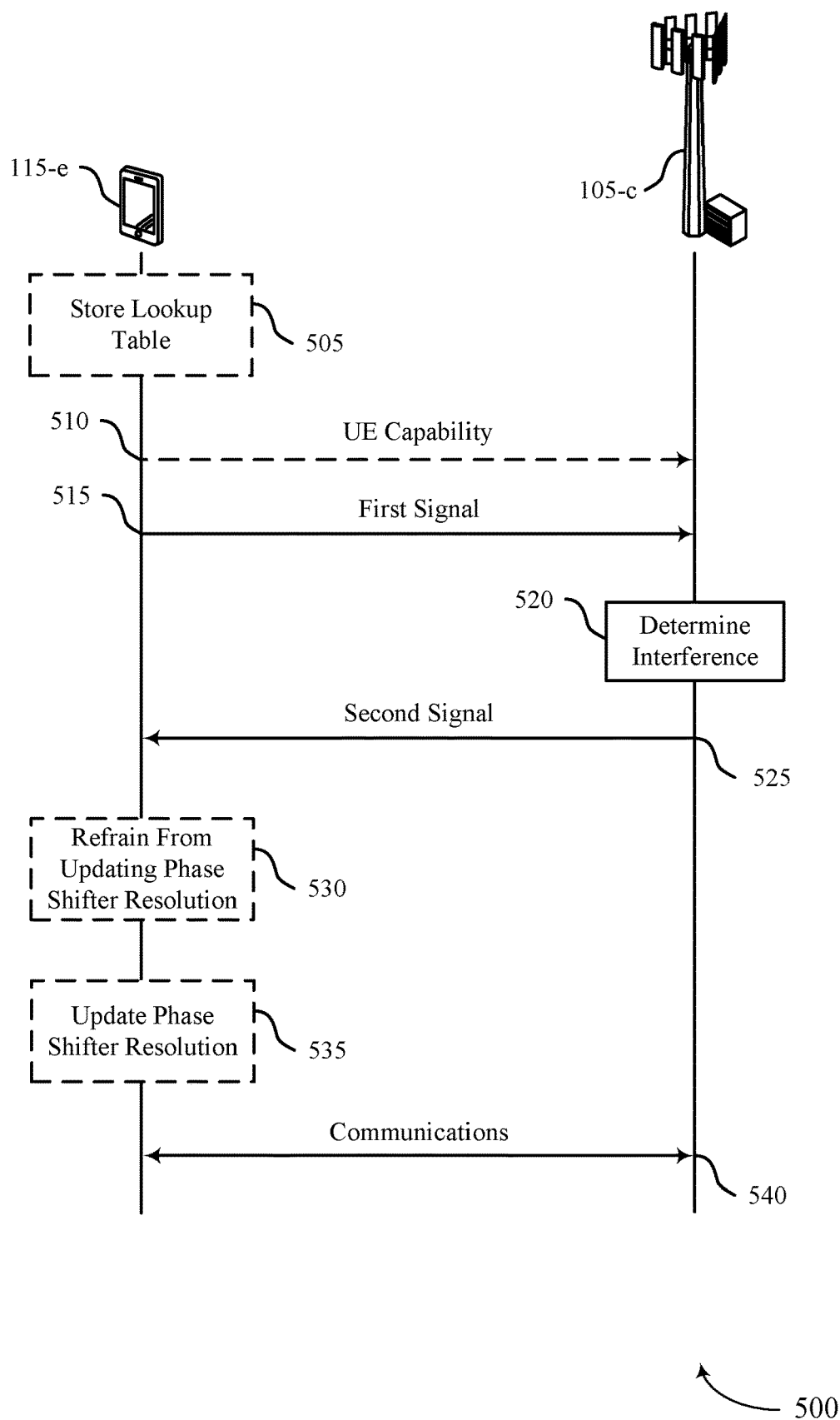
FIGS. 5 and 6 illustrate examples of process flows that support techniques for managing low or variable phase shift resolutions in beam-based communications in accordance with one or more aspects of the present disclosure.

FIG. 5 illustrates an example of a process flow 500 that supports techniques for managing low or variable phase shift resolutions in beam-based communications in accordance with one or more aspects of the present disclosure. The process flow 500 may implement, or be implemented by, aspects of the wireless communications system 100, the wireless communications system 200, the beam refinement process 300, the wireless communications system 400, or a combination thereof. For example, the process flow 500 may include a UE 115-*e* and a network entity 105-*c*, which may be examples of corresponding devices described herein with reference to FIGS. 1 through 4. In the following description of the process flow 500, the operations may be performed in a different order than the order shown. Specific operations also may be left out of the process flow 500, or other operations may be added to the process flow 500. Further, although some operations or signaling may be shown to occur at different times for discussion purposes, these operations may actually occur at the same time.

At 505, the UE 115-*e* may store a lookup table indicating one or more metrics associated with reducing the resolution of a phase shifter at the UE 115-*e*. For example, the lookup table may include a power saving value, a difference value (e.g., the difference between the gain of the main lobe of a beam and the gain of a side lobe of the beam), a selected direction of a side lobe, or a combination thereof. The power saving value may be an example of the power saving value 220, while the difference value may be an example of the gain information 225 as described herein with reference to FIG. 2. Likewise, the selected direction of the side lobe may be an example of the side lobe direction 230. In some cases, the difference value (e.g., gain information 225) may be based on an antenna size for the UE 115-*e*, a steering direction of a beam at the UE 115-*e*, the resolution of the phase shifter at the UE 115-*e*, or a combination thereof.

At 510, the UE 115-*e* may transmit, and the network entity 105-*c* may receive, a signal including UE capability information indicating that the UE 115-*e* may be capable of updating a resolution of a phase shifting operation at the UE 115-*e*. The signal may be an example of the UE capability information 235 as described herein with reference to FIG. 2.

At 515, the UE 115-*e* may transmit, to the network entity 105-*c*, a first signal that includes a request to update a resolution of a phase shifting operation associated with beam-based communications. The first signal may include UCI, a MAC-CE, an RRC signal, or a combination thereof and may be an example of the first signal 210, described herein with reference to FIG. 2. The first signal may include the power saving value, the difference value, the selected direction of a side lobe, or a combination thereof. The request to update the resolution of the phase shifting operation may be an example of a request to update the phase shifting resolution 215, which may be a request to lower the phase shifting resolution. In some examples, the UE 115-*e* may transmit the first signal, including the request, based on the difference value satisfying a threshold difference value. For example, the UE 115-*e* may determine that the difference between the gain of a main lobe and the gain of a side lobe of a beam generated using a lower phase shifter resolution satisfies a difference threshold. Thus, the UE 115-*e* may transmit the first signal requesting to use a low phase shifting resolution based on the difference value. In some other examples, the UE 115-*e* may transmit the request based on the power saving value, such that the UE 115-*e* may use a lower phase shifting resolution to save power.

At 520, the network entity 105-*c* may determine a direction of interference from the UE 115-*e* based on receiving the first signal. In some cases, the network entity 105-*c* may transmit a signal, indicating a request for location information of the UE 115-*e*, one or more other UEs 115, additional network entities 105, or a combination thereof. The network entity 105-*c* may receive the location information from the respective devices and may determine whether the beam generated using a low resolution phase shifter may cause interference based on the received location information.

At 525, the network entity 105-*c* may transmit a second signal approving or denying the request to update the resolution of the phase shifting operation based on the location information for the UE 115-*e*, the location information of the one or more additional UEs 115, the location information of the one or more network entities 105, or a combination thereof. The second signal may be DCI, a MAC-CE, an RRC signal, or a combination thereof.

At 530, the UE 115-*e* may receive the second signal denying the request to update the resolution of the phase shifting operation. In response, the UE 115-*e* may refrain from updating the resolution of the phase shifting operation.

At 535, the UE 115-*e* may receive the second signal approving the request to update the resolution of the phase shifting operation. In some examples, the UE 115-*e* may be configured with multiple phase shifters (e.g., a high-resolution phase shifter and a low-resolution phase shifter). The UE 115-*e* may switch from using a first phase shifter (e.g., high-resolution phase shifter) with a first phase shifting resolution (e.g., five or more bits) to a second phase shifter (e.g., low-resolution phase shifter) with a second phase shifting resolution (e.g., two bits) based on receiving the second signal approving the request. In some other examples, the UE 115-*e* may be configured with a variable-resolution phase shifter. The UE 115-*e* may perform the phase shifting operation based on using a subset of a bits. That is, the UE 115-*c* may refrain from switching from a first phase shifter to a second phase shifter and may instead dynamically reduce the resolution of the variable-resolution phase shifter.

At 540, the UE 115-*e* may communicate with the network entity 105-*c* using a beam according to performing the update or refraining from performing the update to the resolution of the phase shifting operation (e.g., based on receiving the second signal). In some cases, the UE 115-*e* may communicate with the network entity 105-*c* using the first phase shifter (e.g., high-resolution phase shifter) based on receiving the second signal denying the request. In some other cases, the UE 115-*c* may communicate using a beam according to the updated resolution of the phase shifting operation based on the second signal approving the request.

Figure 6:
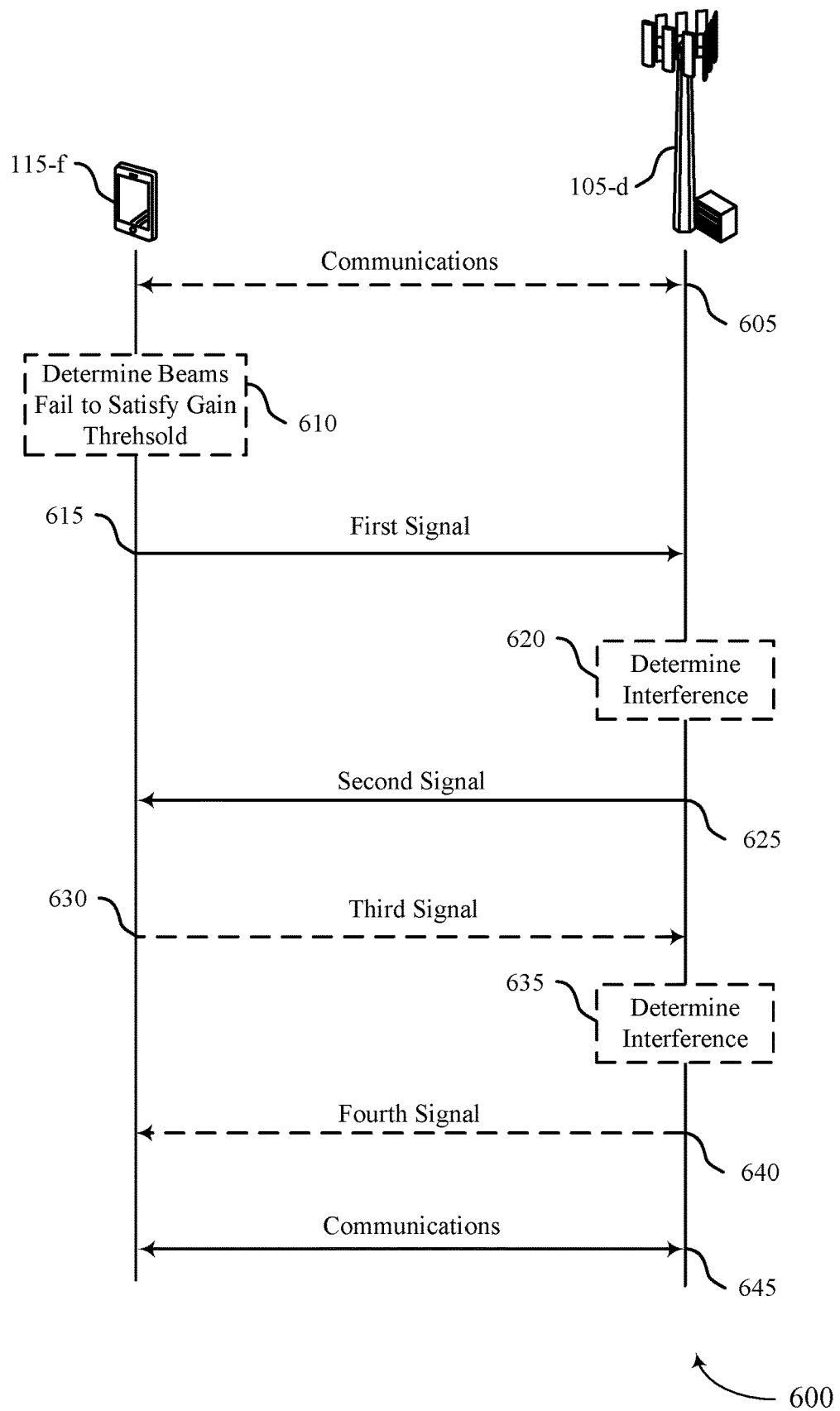

FIG. 6 illustrates an example of a process flow 600 that supports techniques for managing low or variable phase shift resolutions in beam-based communications in accordance with one or more aspects of the present disclosure. The process flow 600 may implement, or be implemented by, aspects of the wireless communications system 100, the wireless communications system 200, the beam refinement process 300, the wireless communications system 400, or a combination thereof. For example, the process flow 600 may include a UE 115-*f* and a network entity 105-*d*, which may be examples of corresponding devices described herein with reference to FIGS. 1 through 5. In the following description of the process flow 600, the operations may be performed in a different order than the order shown. Specific operations also may be left out of the process flow 600, or other operations may be added to the process flow 600. Further, although some operations or signaling may be shown to occur at different times for discussion purposes, these operations may actually occur at the same time.

At 605, the UE 115-*f* may communicate with the network entity 105-*d* using a beam prior to performing a beam refinement process, where the beam corresponds to a first beam associated with a first beamwidth. In some examples, the UE 115-*f* may communicate via a beam generated using a low-resolution phase shifter. In some examples, the UE 115-*f* may receive one or more reference signals for a beam refinement process. The reference signals may be examples of CSI-RSs described herein with reference to FIG. 3. In such examples, the UE 115-*f* may select one or more second beams (e.g., multiple beams or a single beam) associated with a second beamwidth for a next state of the beam refinement process based on the reference signals.

At 610, the UE 115-*f* may determine that the one or more second beams (e.g., a next "best" beam or each of the next beam options) fail to satisfy a threshold difference between a first array gain of a main lobe and a second array gain of a side lobe. That is, the UE 115-*f* may determine that the difference between the gain of the main lobe of the one or more second beams and the gain of the side lobe of the one or more second beams is not greater than or equal to the threshold difference.

At 615, the UE 115-*f* may transmit, to the network entity 105-*d*, a first signal that includes a request to suspend the beam refinement process at the UE 115-*f*. In some cases, the UE 115-*f* may request to suspend the beam refinement process based on a resolution of a phase shifting operation (e.g., a low-resolution phase shifter) associated with beam-based communications. Additionally, or alternatively, the UE 115-*f* may transmit the first signal based on the difference threshold, an interference threshold, one or more steering directions of the beam, or a combination thereof. That is, the UE 115-*f* may determine that one or more refined beams for a current beam generated using a low-resolution phase shifter may increase interference during communications. In response, the UE 115-*f* may transmit a first signal, which may be an example of a first signal 415, indicating a request to suspend beam refinement.

At 620, the network entity 105-*d* may determine a direction of interference from the UE 115-*f* based on receiving the request to suspend the beam refinement process. In some examples, the network entity 105-*d* may transmit one or more signals to the UE 115-*f*, one or more additional UEs 115, one or more network entities 105, or a combination thereof indicating a request for location information. The network entity 105-*d* may determine whether the refined beam for the UE 115-*f* may interfere with the one or more additional UEs 115, the one or more network entities 105, or a combination thereof based on the location information.

At 625, the network entity 105-*d* may transmit a second signal approving or denying the request to suspend the beam refinement process at the UE 115-*f* based on the location of the UE 115-*f*, the location of one or more additional UEs 115, the location of one or more network entities 105, or a combination thereof. The second signal may be an example of the second signal 420 described herein with reference to FIG. 4. In some cases, the second signal may include a one-bit field indicating activation or suspension of the beam refinement process. In some cases, the network entity 105-*d* may approve the request to suspend beam refinement at the UE 115-*f*. In some other cases, the network entity may deny the request to suspend beam refinement at the UE 115-*f*. Thus, the UE 115-*f* may suspend the beam refinement process or may continue the beam refinement process based on receiving the second signal.

At 630, the UE 115-*f* may transmit a third signal including a second request to activate a beam refinement process. For example, the UE 115-*f* may determine that one or more second beams associated with the next stage of beam refinement may satisfy the difference threshold or fail to satisfy the interference threshold, thus enabling the UE 115-*f* to perform the beam refinement procedure without causing significant interference to one or more other devices. The third signal may be an example of the third signal 425.

At 635, the network entity 105-*d* may determine directional interference based on location information of the UE 115-*f*, one or more additional UEs 115, one or more network entities 105, or a combination thereof. At 640, the UE 115-*f* may receive, from the network entity 105-*d*, a fourth signal approving the second request to activate the beam refinement process. Thus, the UE 115-*f* may perform the beam refinement process for the beam according to activating the beam refinement process.

At 645, the UE 115-*f* may communicate with the network entity 105-*d* using a beam according to suspending the beam refinement process or activating the beam refinement process (e.g., based on the second signal, the fourth signal, or both).

Figure 7:
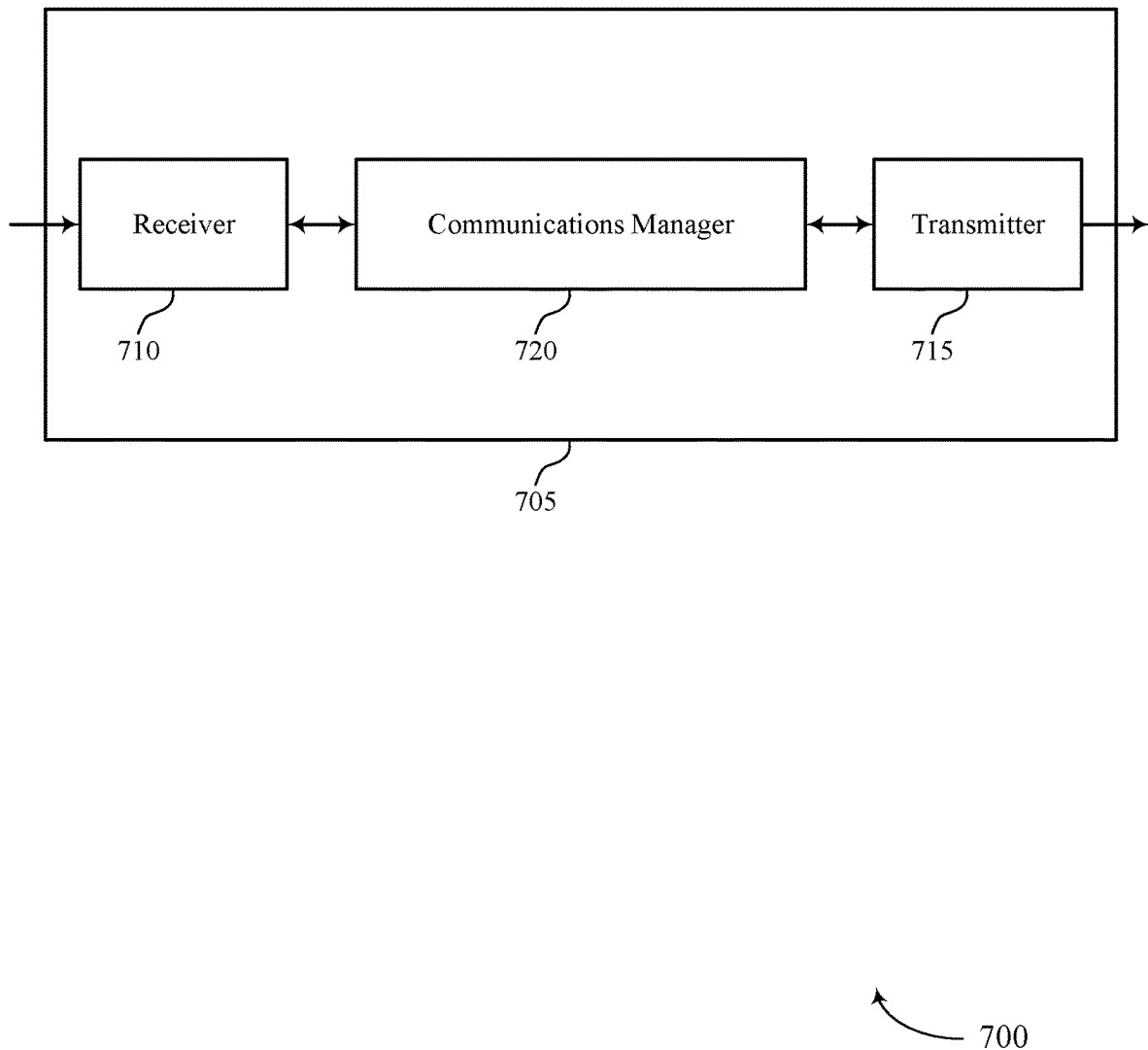
FIGS. 7 and 8 show block diagrams of devices that support techniques for managing low or variable phase shift resolutions in beam-based communications in accordance with one or more aspects of the present disclosure.

FIG. 7 shows a block diagram 700 of a device 705 that supports techniques for managing low or variable phase shift resolutions in beam-based communications in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for managing low or variable phase shift resolutions in beam-based communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for managing low or variable phase shift resolutions in beam-based communications). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for managing low or variable phase shift resolutions in beam-based communications as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. For example, the communications manager 720 may be configured as or otherwise support a means for transmitting, to a network entity, a first signal including a request to update a resolution of a phase shifting operation associated with beam-based communications. The communications manager 720 may be configured as or otherwise support a means for receiving, from the network entity, a second signal approving the request to update the resolution of the phase shifting operation. The communications manager 720 may be configured as or otherwise support a means for communicating using a beam according to an updated resolution of the phase shifting operation based on the second signal approving the request.

Additionally, or alternatively, the communications manager 720 may support wireless communications at a UE in accordance with examples as disclosed herein. For example, the communications manager 720 may be configured as or otherwise support a means for transmitting, to a network entity, a first signal including a request to suspend a beam refinement process at the UE based on a resolution of a phase shifting operation associated with beam-based communications. The communications manager 720 may be configured as or otherwise support a means for receiving, from the network entity, a second signal approving the request to suspend the beam refinement process at the UE. The communications manager 720 may be configured as or otherwise support a means for communicating using a beam according to suspending the beam refinement process at the UE based on the second signal approving the request.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for dynamically updating the resolution of a phase shifter, which may reduce a processing overhead and reduce power consumption at the device 705.

Figure 8:
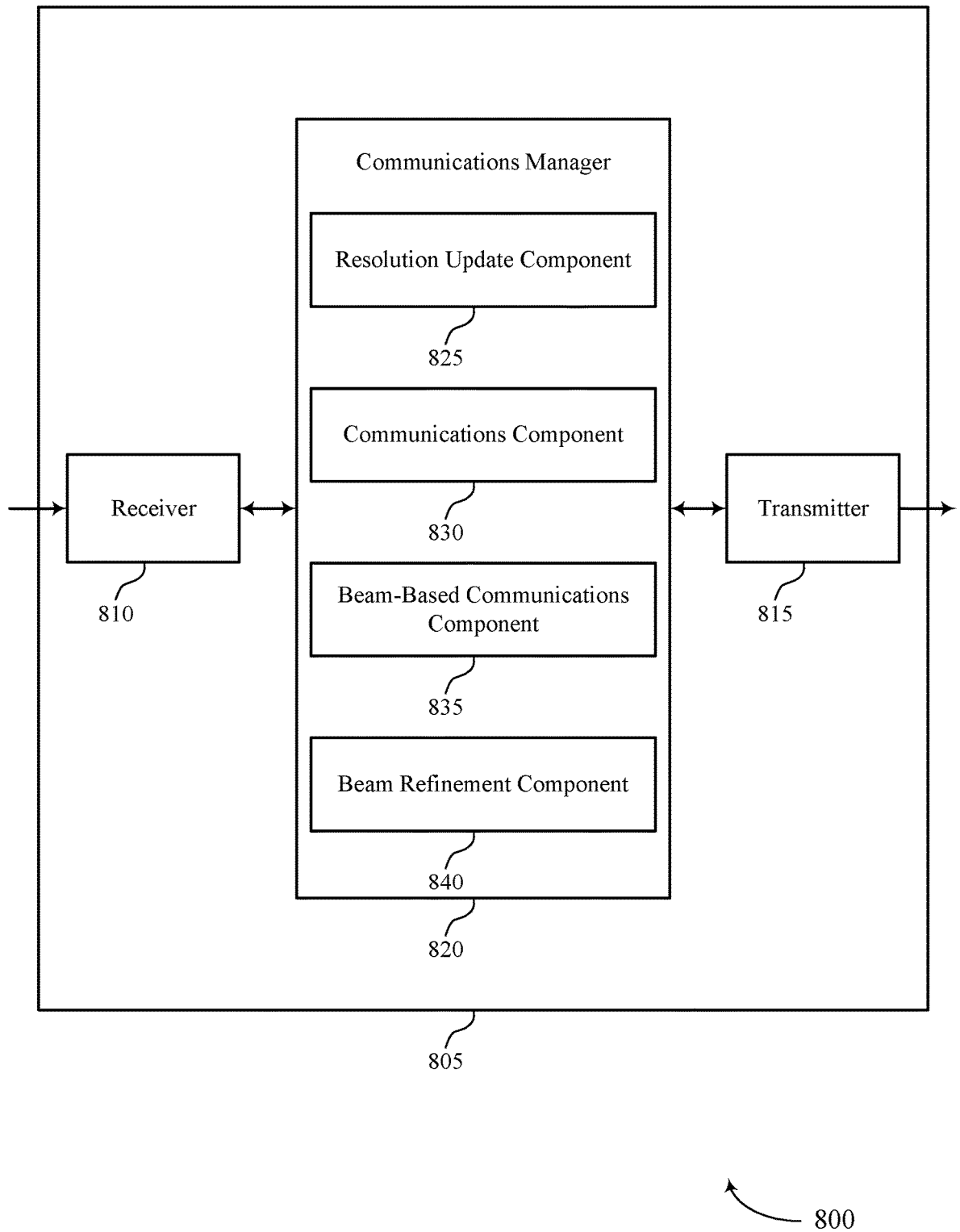

FIG. 8 shows a block diagram 800 of a device 805 that supports techniques for managing low or variable phase shift resolutions in beam-based communications in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for managing low or variable phase shift resolutions in beam-based communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for managing low or variable phase shift resolutions in beam-based communications). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for managing low or variable phase shift resolutions in beam-based communications as described herein. For example, the communications manager 820 may include a resolution update component 825, a communications component 830, a beam-based communications component 835, a beam refinement component 840, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. The resolution update component 825 may be configured as or otherwise support a means for transmitting, to a network entity, a first signal including a request to update a resolution of a phase shifting operation associated with beam-based communications. The communications component 830 may be configured as or otherwise support a means for receiving, from the network entity, a second signal approving the request to update the resolution of the phase shifting operation. The beam-based communications component 835 may be configured as or otherwise support a means for communicating using a beam according to an updated resolution of the phase shifting operation based on the second signal approving the request.

Additionally, or alternatively, the communications manager 820 may support wireless communications at a UE in accordance with examples as disclosed herein. The beam refinement component 840 may be configured as or otherwise support a means for transmitting, to a network entity, a first signal including a request to suspend a beam refinement process at the UE based on a resolution of a phase shifting operation associated with beam-based communications. The communications component 830 may be configured as or otherwise support a means for receiving, from the network entity, a second signal approving the request to suspend the beam refinement process at the UE. The beam-based communications component 835 may be configured as or otherwise support a means for communicating using a beam according to suspending the beam refinement process at the UE based on the second signal approving the request.

Figure 9:
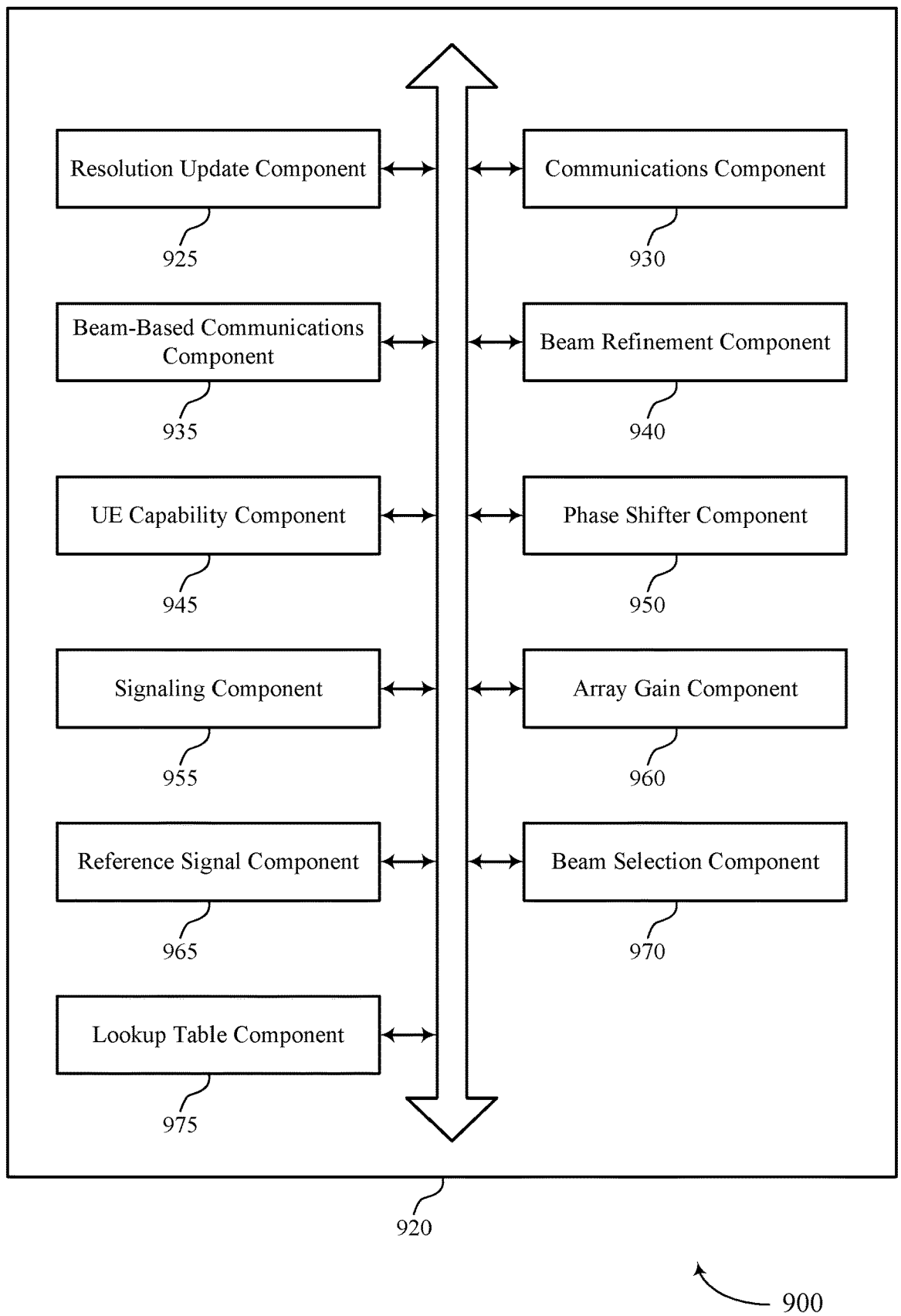
FIG. 9 shows a block diagram of a communications manager that supports techniques for managing low or variable phase shift resolutions in beam-based communications in accordance with one or more aspects of the present disclosure.

FIG. 9 shows a block diagram 900 of a communications manager 920 that supports techniques for managing low or variable phase shift resolutions in beam-based communications in accordance with one or more aspects of the present disclosure. The communications manager 920 may be an example of aspects of a communications manager 720, a communications manager 820, or both, as described herein. The communications manager 920, or various components thereof, may be an example of means for performing various aspects of techniques for managing low or variable phase shift resolutions in beam-based communications as described herein. For example, the communications manager 920 may include a resolution update component 925, a communications component 930, a beam-based communications component 935, a beam refinement component 940, a UE capability component 945, a phase shifter component 950, a signaling component 955, an array gain component 960, a reference signal component 965, a beam selection component 970, a lookup table component 975, or any combination thereof. Each of these components may communicate, directly or indirectly, with one another (e.g., via one or more buses).

The communications manager 920 may support wireless communications at a UE in accordance with examples as disclosed herein. The resolution update component 925 may be configured as or otherwise support a means for transmitting, to a network entity, a first signal including a request to update a resolution of a phase shifting operation associated with beam-based communications. The communications component 930 may be configured as or otherwise support a means for receiving, from the network entity, a second signal approving the request to update the resolution of the phase shifting operation. The beam-based communications component 935 may be configured as or otherwise support a means for communicating using a beam according to an updated resolution of the phase shifting operation based on the second signal approving the request.

In some examples, the UE capability component 945 may be configured as or otherwise support a means for transmitting, to the network entity, a third signal including UE capability information indicating that the UE is capable of updating the resolution of the phase shifting operation, where the request to update the resolution of the phase shifting operation is based on the UE capability information.

In some examples, the phase shifter component 950 may be configured as or otherwise support a means for refraining from performing one or more steps of the phase shifting operation in response to the second signal approving the request, the updated resolution of the phase shifting operation corresponding to the refraining from performing the one or more steps.

In some examples, the phase shifting operation is based on a set of multiple bits, and the phase shifter component 950 may be configured as or otherwise support a means for performing phase shifting using a subset of the set of multiple bits for the phase shifting operation, where the refraining from performing the one or more steps is based on the subset of the set of multiple bits.

In some examples, the UE is configured with a set of multiple phase shifters including at least a first phase shifter and a second phase shifter, and the phase shifter component 950 may be configured as or otherwise support a means for switching from the first phase shifter with a first phase shifting resolution to the second phase shifter with a second phase shifting resolution in response to the second signal approving the request, the updated resolution of the phase shifting operation corresponding to the second phase shifting resolution.

In some examples, the first signal further indicates a power saving value for the update to the resolution of the phase shifting operation, a difference value between a first array gain of a main lobe and a second array gain of a side lobe in a selected direction for the beam-based communications, the selected direction of the side lobe with the second array gain, or a combination thereof. In some examples, the second signal approves the request based on the power saving value, the difference value, the selected direction of the side lobe, or a combination thereof.

In some examples, the first signal including the request to update the resolution of the phase shifting operation is transmitted based on the difference value satisfying a threshold difference value for the main lobe and the side lobe.

In some examples, the lookup table component 975 may be configured as or otherwise support a means for storing a lookup table indicating the power saving value, the difference value, the selected direction of the side lobe, or a combination thereof based on the updated resolution of the phase shifting operation, where the first signal is based on the lookup table.

In some examples, the difference value between the first array gain of the main lobe and the second array gain of the side lobe is based on an antenna array size for the UE, a steering direction for the beam, the updated resolution of the phase shifting operation, or a combination thereof.

In some examples, the first signal includes UCI, a first MAC-CE, a first RRC signal, or a combination thereof. In some examples, the second signal includes DCI, a second MAC-CE, a second RRC signal, or a combination thereof.

Additionally, or alternatively, the communications manager 920 may support wireless communications at a UE in accordance with examples as disclosed herein. The beam refinement component 940 may be configured as or otherwise support a means for transmitting, to a network entity, a first signal including a request to suspend a beam refinement process at the UE based on a resolution of a phase shifting operation associated with beam-based communications. In some examples, the communications component 930 may be configured as or otherwise support a means for receiving, from the network entity, a second signal approving the request to suspend the beam refinement process at the UE. In some examples, the beam-based communications component 935 may be configured as or otherwise support a means for communicating using a beam according to suspending the beam refinement process at the UE based on the second signal approving the request.

In some examples, the beam-based communications component 935 may be configured as or otherwise support a means for communicating using the beam prior to the beam refinement process, where the beam includes a first beam associated with a first beamwidth. In some examples, the array gain component 960 may be configured as or otherwise support a means for determining that a set of multiple second beams associated with a second beamwidth and corresponding to a next stage of the beam refinement process fail to satisfy a threshold difference between a first array gain of a main lobe and a second array gain of a side lobe, where the first signal including the request to suspend the beam refinement process is transmitted based on the determining.

In some examples, the beam-based communications component 935 may be configured as or otherwise support a means for communicating using the beam prior to the beam refinement process, where the beam includes a first beam associated with a first beamwidth. In some examples, the reference signal component 965 may be configured as or otherwise support a means for receiving one or more reference signals for the beam refinement process. In some examples, the beam selection component 970 may be configured as or otherwise support a means for selecting a second beam associated with a second beamwidth for a next stage of the beam refinement process based on the one or more reference signals. In some examples, the array gain component 960 may be configured as or otherwise support a means for determining that the second beam fails to satisfy a threshold difference between a first array gain of a main lobe and a second array gain of a side lobe, where the first signal including the request to suspend the beam refinement process is transmitted based on the determining.

In some examples, the beam refinement component 940 may be configured as or otherwise support a means for transmitting, to the network entity, a third signal including a second request to activate the beam refinement process at the UE. In some examples, the communications component 930 may be configured as or otherwise support a means for receiving, from the network entity, a fourth signal approving the second request to activate the beam refinement process at the UE. In some examples, the beam refinement component 940 may be configured as or otherwise support a means for performing the beam refinement process for the beam according to activating the beam refinement process at the UE based on the fourth signal.

In some examples, the second signal includes a one-bit field indicating to activate or suspend the beam refinement process.

In some examples, the first signal including the request to suspend the beam refinement process is transmitted further based on a threshold difference between a first array gain of a main lobe and a second array gain of a side lobe, an interference threshold for the beam-based communications, one or more steering directions, or a combination thereof.

Figure 10:
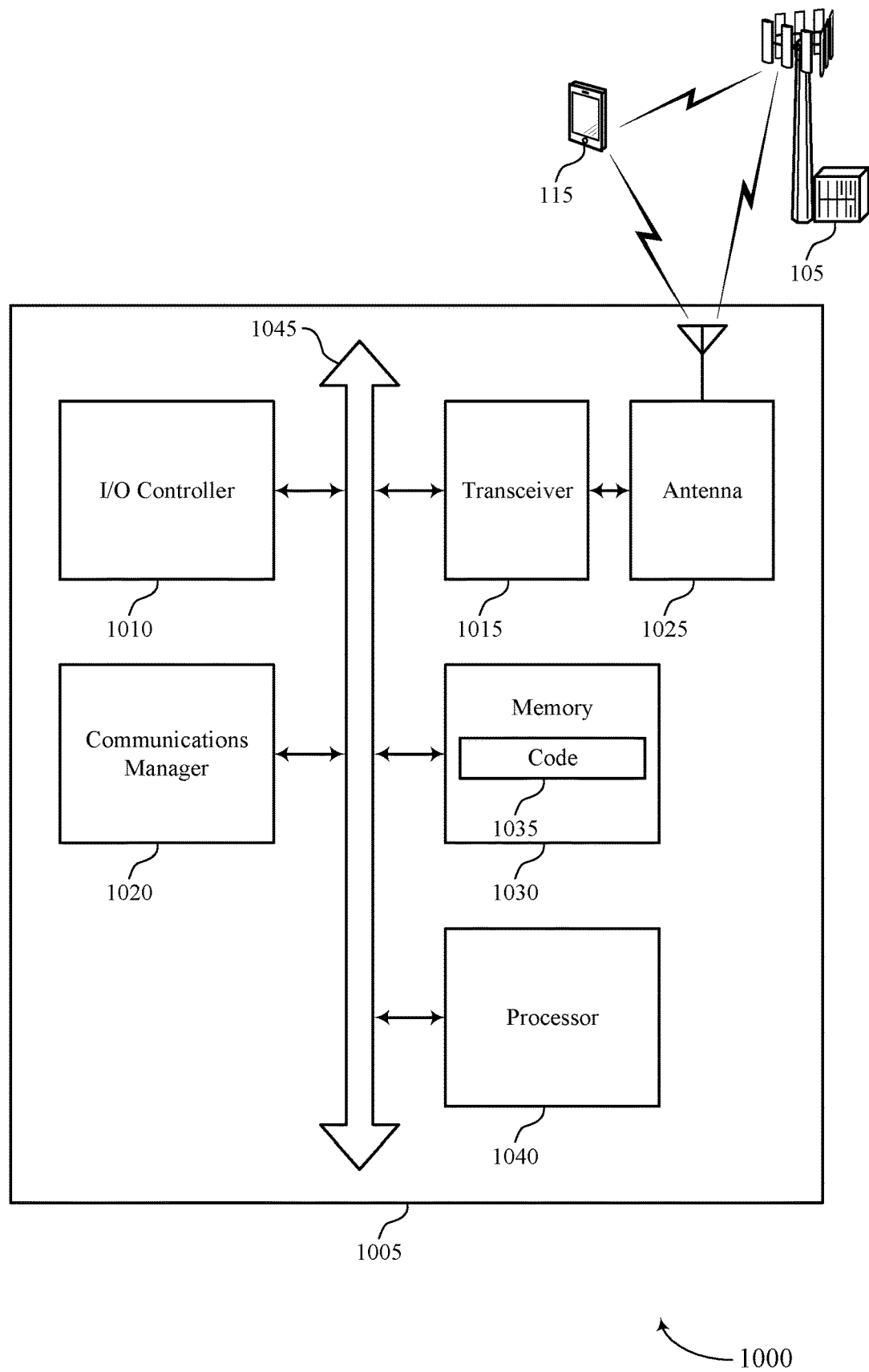
FIG. 10 shows a diagram of a system including a device that supports techniques for managing low or variable phase shift resolutions in beam-based communications in accordance with one or more aspects of the present disclosure.

FIG. 10 shows a diagram of a system 1000 including a device 1005 that supports techniques for managing low or variable phase shift resolutions in beam-based communications in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for managing low or variable phase shift resolutions in beam-based communications). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for transmitting, to a network entity, a first signal including a request to update a resolution of a phase shifting operation associated with beam-based communications. The communications manager 1020 may be configured as or otherwise support a means for receiving, from the network entity, a second signal approving the request to update the resolution of the phase shifting operation. The communications manager 1020 may be configured as or otherwise support a means for communicating using a beam according to an updated resolution of the phase shifting operation based on the second signal approving the request.

Additionally, or alternatively, the communications manager 1020 may support wireless communications at a UE in accordance with examples as disclosed herein. For example, the communications manager 1020 may be configured as or otherwise support a means for transmitting, to a network entity, a first signal including a request to suspend a beam refinement process at the UE based on a resolution of a phase shifting operation associated with beam-based communications. The communications manager 1020 may be configured as or otherwise support a means for receiving, from the network entity, a second signal approving the request to suspend the beam refinement process at the UE. The communications manager 1020 may be configured as or otherwise support a means for communicating using a beam according to suspending the beam refinement process at the UE based on the second signal approving the request.

By including or configuring the communications manager 1020 in accordance with examples as described herein, the device 1005 may support techniques for updating phase shifter resolution and beam refinement processes, which may provide for improved user experience related to reduced processing overhead, reduced power consumption, more efficient utilization of communication resources, and longer battery life.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for managing low or variable phase shift resolutions in beam-based communications as described herein, or the processor 1040 and the memory 1030 may be otherwise configured to perform or support such operations.

Figure 11:
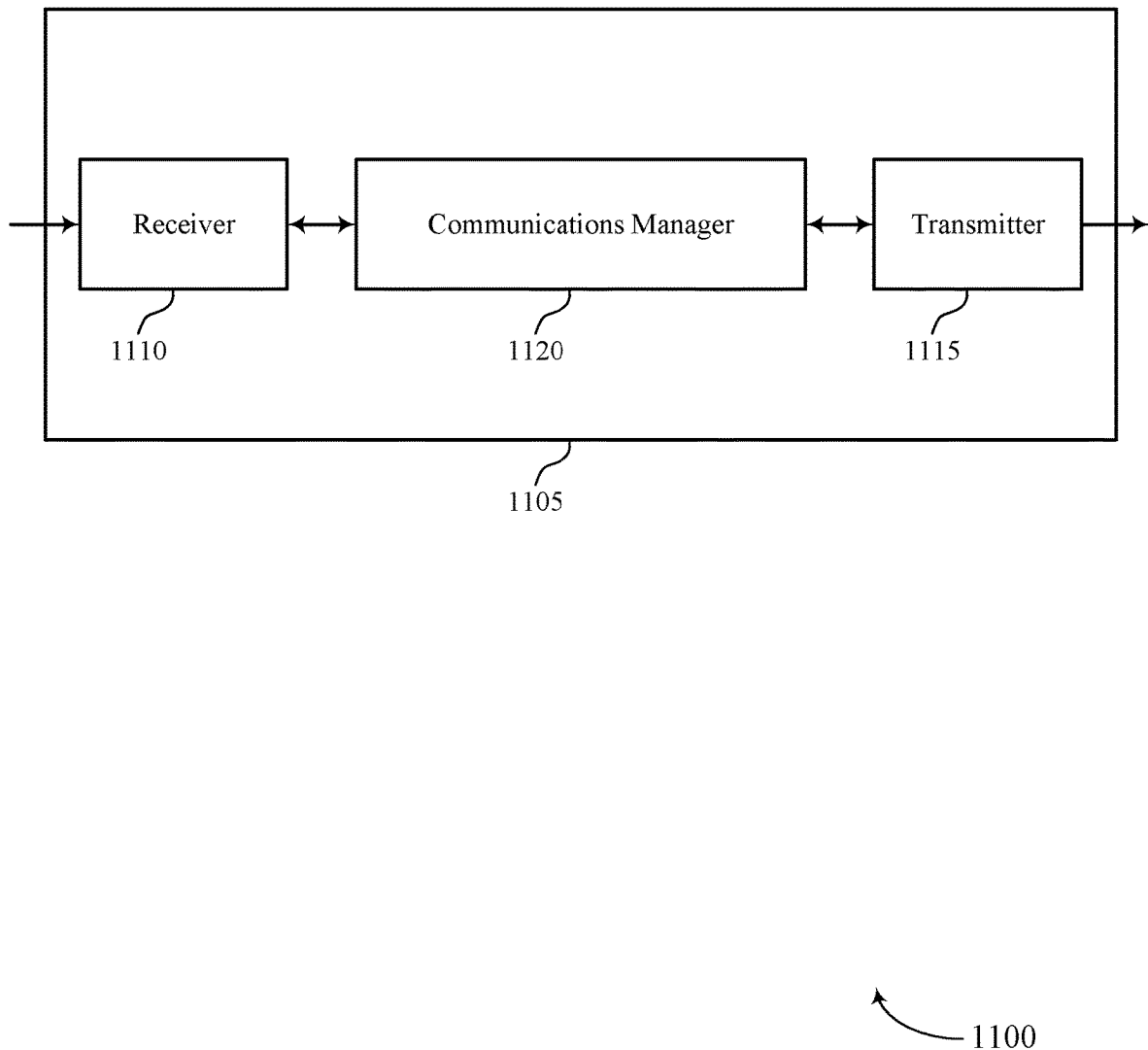
FIGS. 11 and 12 show block diagrams of devices that support techniques for managing low or variable phase shift resolutions in beam-based communications in accordance with one or more aspects of the present disclosure.

FIG. 11 shows a block diagram 1100 of a device 1105 that supports techniques for managing low or variable phase shift resolutions in beam-based communications in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of techniques for managing low or variable phase shift resolutions in beam-based communications as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. For example, the communications manager 1120 may be configured as or otherwise support a means for receiving a first signal including a request to update a resolution of a phase shifting operation at a UE. The communications manager 1120 may be configured as or otherwise support a means for transmitting a second signal approving the request to update the resolution of the phase shifting operation based on first location information for the UE and second location information for one or more other UEs. The communications manager 1120 may be configured as or otherwise support a means for communicating based on the second signal approving the request.

Additionally, or alternatively, the communications manager 1120 may support wireless communications in accordance with examples as disclosed herein. For example, the communications manager 1120 may be configured as or otherwise support a means for receiving a first signal including a request to suspend a beam refinement process at a UE based on a resolution of a phase shifting operation at the UE. The communications manager 1120 may be configured as or otherwise support a means for transmitting a second signal approving the request to suspend the beam refinement process at the UE based on first location information for the UE and second location information for one or more other UEs. The communications manager 1120 may be configured as or otherwise support a means for communicating based on the second signal approving the request to suspend the beam refinement process at the UE.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for updating phase shifter resolution and beam refinement processes, which may provide for reduced processing overhead, reduced power consumption, and more efficient utilization of communication resources.

Figure 12:
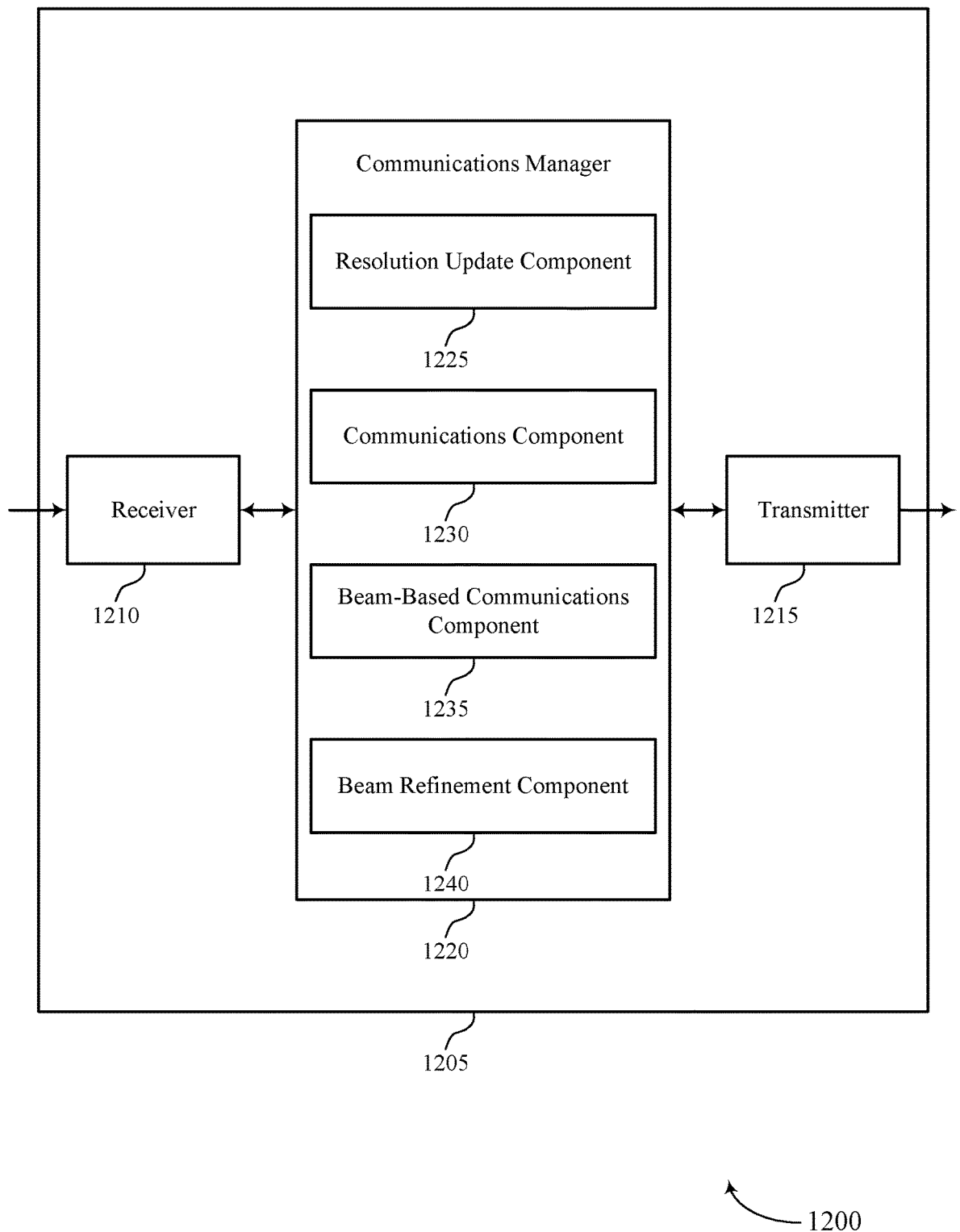

FIG. 12 shows a block diagram 1200 of a device 1205 that supports techniques for managing low or variable phase shift resolutions in beam-based communications in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of techniques for managing low or variable phase shift resolutions in beam-based communications as described herein. For example, the communications manager 1220 may include a resolution update component 1225, a communications component 1230, a beam-based communications component 1235, a beam refinement component 1240, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications in accordance with examples as disclosed herein. The resolution update component 1225 may be configured as or otherwise support a means for receiving a first signal including a request to update a resolution of a phase shifting operation at a UE. The communications component 1230 may be configured as or otherwise support a means for transmitting a second signal approving the request to update the resolution of the phase shifting operation based on first location information for the UE and second location information for one or more other UEs. The beam-based communications component 1235 may be configured as or otherwise support a means for communicating based on the second signal approving the request.

Additionally, or alternatively, the communications manager 1220 may support wireless communications in accordance with examples as disclosed herein. The beam refinement component 1240 may be configured as or otherwise support a means for receiving a first signal including a request to suspend a beam refinement process at a UE based on a resolution of a phase shifting operation at the UE. The communications component 1230 may be configured as or otherwise support a means for transmitting a second signal approving the request to suspend the beam refinement process at the UE based on first location information for the UE and second location information for one or more other UEs. The beam-based communications component 1235 may be configured as or otherwise support a means for communicating based on the second signal approving the request to suspend the beam refinement process at the UE.

Figure 13:
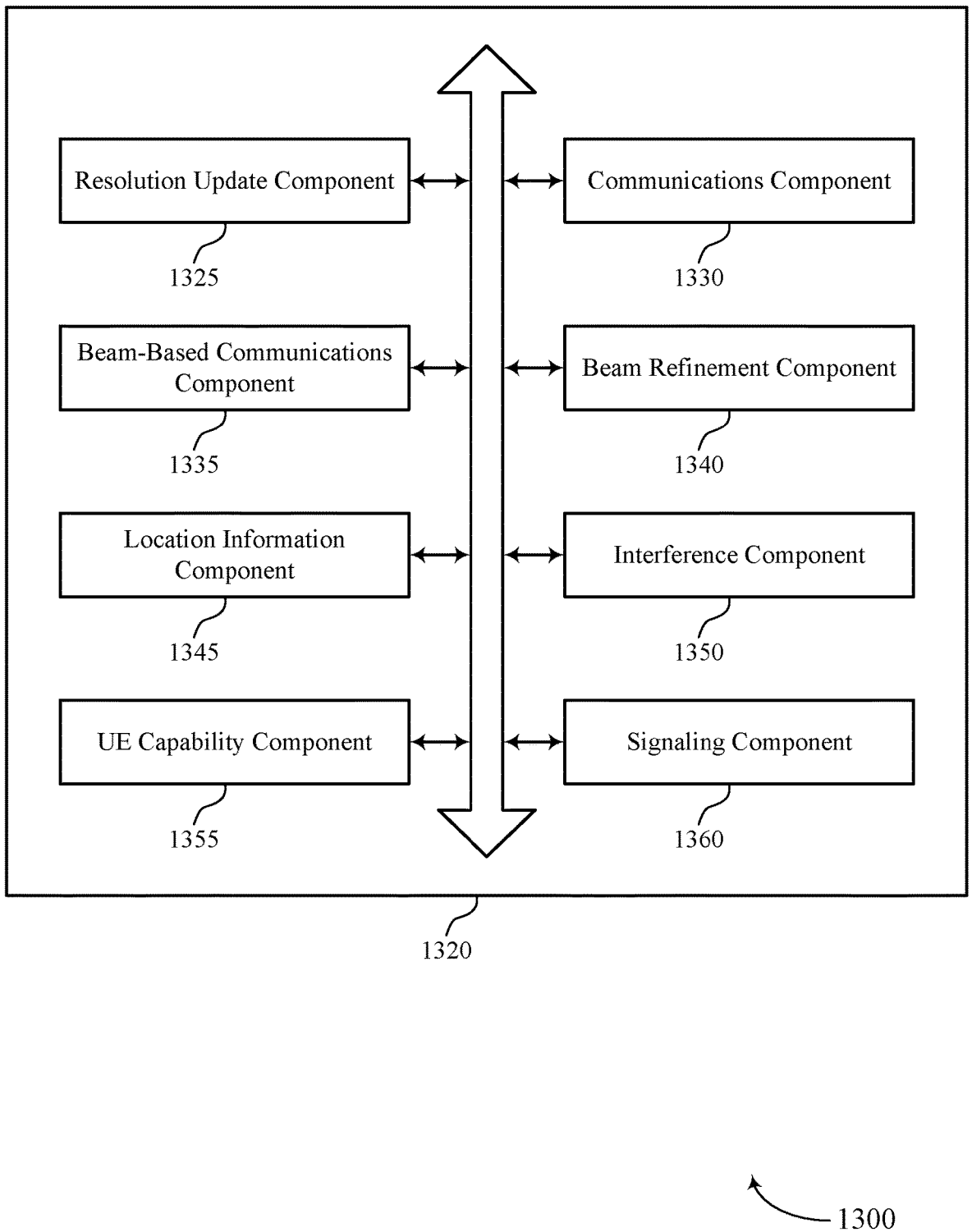
FIG. 13 shows a block diagram of a communications manager that supports techniques for managing low or variable phase shift resolutions in beam-based communications in accordance with one or more aspects of the present disclosure.

FIG. 13 shows a block diagram 1300 of a communications manager 1320 that supports techniques for managing low or variable phase shift resolutions in beam-based communications in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of techniques for managing low or variable phase shift resolutions in beam-based communications as described herein. For example, the communications manager 1320 may include a resolution update component 1325, a communications component 1330, a beam-based communications component 1335, a beam refinement component 1340, a location information component 1345, an interference component 1350, a UE capability component 1355, a signaling component 1360, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications in accordance with examples as disclosed herein. The resolution update component 1325 may be configured as or otherwise support a means for receiving a first signal including a request to update a resolution of a phase shifting operation at a UE. The communications component 1330 may be configured as or otherwise support a means for transmitting a second signal approving the request to update the resolution of the phase shifting operation based on first location information for the UE and second location information for one or more other UEs. The beam-based communications component 1335 may be configured as or otherwise support a means for communicating based on the second signal approving the request.

In some examples, the location information component 1345 may be configured as or otherwise support a means for receiving, from a network entity, a third signal indicating at least a portion of the second location information for the one or more other UEs, where the second signal approves the request based on the third signal.

In some examples, the location information component 1345 may be configured as or otherwise support a means for transmitting a fourth signal requesting location information from the UE, the one or more other UEs, the network entity, or a combination thereof, where the second signal approves the request based on the fourth signal requesting the location information.

In some examples, the interference component 1350 may be configured as or otherwise support a means for determining a direction of interference from the UE based on the request to update the resolution of the phase shifting operation, where the second signal approves the request based on the direction of interference and the second location information for the one or more other UEs.

In some examples, the resolution update component 1325 may be configured as or otherwise support a means for receiving a third signal including a second request to update a resolution of a second phase shifting operation at a second UE. In some examples, the resolution update component 1325 may be configured as or otherwise support a means for transmitting a fourth signal denying the second request to update the resolution of the second phase shifting operation based on third location information for the second UE and the second location information for the one or more other UEs.

In some examples, the UE capability component 1355 may be configured as or otherwise support a means for receiving a third signal including UE capability information indicating that the UE is capable of updating the resolution of the phase shifting operation, where the request to update the resolution of the phase shifting operation is based on the UE capability information.

In some examples, the first signal further indicates a power saving value for the update to the resolution of the phase shifting operation, a difference value between a first array gain of a main lobe and a second array gain of a side lobe in a selected direction, the selected direction of the side lobe with the second array gain, or a combination thereof. In some examples, the second signal approves the request based on the power saving value, the difference value, the selected direction of the side lobe, or a combination thereof.

In some examples, the first signal includes UCI, a first MAC-CE, a first RRC signal, or a combination thereof. In some examples, the second signal includes DCI, a second MAC-CE, a second RRC signal, or a combination thereof.

Additionally, or alternatively, the communications manager 1320 may support wireless communications in accordance with examples as disclosed herein. The beam refinement component 1340 may be configured as or otherwise support a means for receiving a first signal including a request to suspend a beam refinement process at a UE based on a resolution of a phase shifting operation at the UE. In some examples, the communications component 1330 may be configured as or otherwise support a means for transmitting a second signal approving the request to suspend the beam refinement process at the UE based on first location information for the UE and second location information for one or more other UEs. In some examples, the beam-based communications component 1335 may be configured as or otherwise support a means for communicating based on the second signal approving the request to suspend the beam refinement process at the UE.

In some examples, the location information component 1345 may be configured as or otherwise support a means for receiving, from a network entity, a third signal indicating at least a portion of the second location information for the one or more other UEs, where the second signal approves the request based on the third signal.

In some examples, the location information component 1345 may be configured as or otherwise support a means for transmitting a fourth signal requesting location information from the UE, the one or more other UEs, the network entity, or a combination thereof, where the second signal approves the request based on the fourth signal requesting the location information.

In some examples, the interference component 1350 may be configured as or otherwise support a means for determining a direction of interference from the UE based on the request to suspend the beam refinement process at the UE, where the second signal approves the request to suspend the beam refinement process at the UE based on the direction of interference and the second location information for the one or more other UEs.

In some examples, the beam refinement component 1340 may be configured as or otherwise support a means for receiving a third signal including a second request to suspend a second beam refinement process at a second UE. In some examples, the communications component 1330 may be configured as or otherwise support a means for transmitting a fourth signal denying the second request to suspend the second beam refinement process at the second UE based on third location information for the second UE and the second location information for the one or more other UEs.

In some examples, the beam refinement component 1340 may be configured as or otherwise support a means for receiving a third signal including a second request to activate the beam refinement process at the UE. In some examples, the communications component 1330 may be configured as or otherwise support a means for transmitting a fourth signal approving the second request to activate the beam refinement process at the UE based on the first location information for the UE and the second location information for the one or more other UEs.

Figure 14:
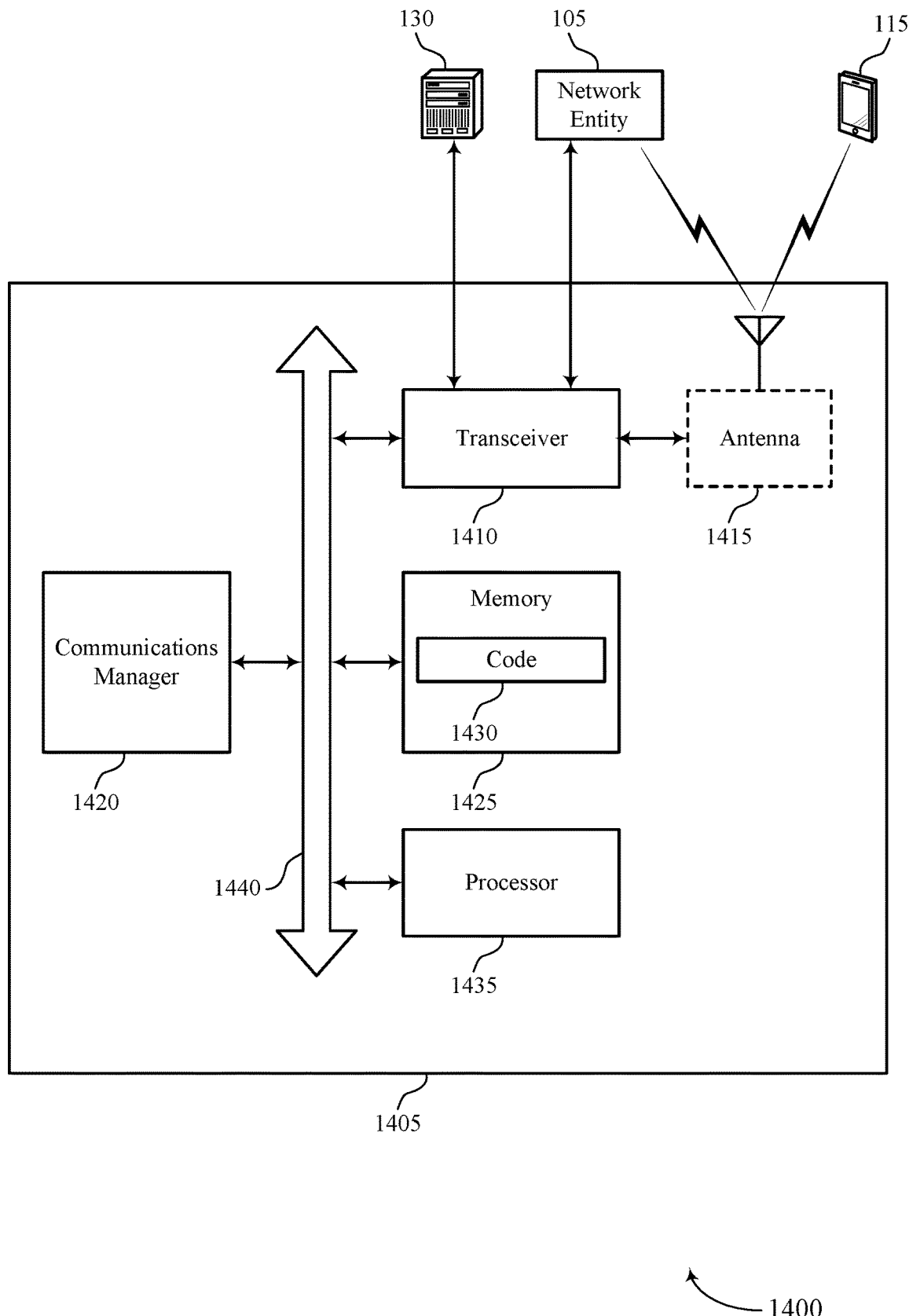
FIG. 14 shows a diagram of a system including a device that supports techniques for managing low or variable phase shift resolutions in beam-based communications in accordance with one or more aspects of the present disclosure.

FIG. 14 shows a diagram of a system 1400 including a device 1405 that supports techniques for managing low or variable phase shift resolutions in beam-based communications in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting techniques for managing low or variable phase shift resolutions in beam-based communications). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications in accordance with examples as disclosed herein. For example, the communications manager 1420 may be configured as or otherwise support a means for receiving a first signal including a request to update a resolution of a phase shifting operation at a UE. The communications manager 1420 may be configured as or otherwise support a means for transmitting a second signal approving the request to update the resolution of the phase shifting operation based on first location information for the UE and second location information for one or more other UEs. The communications manager 1420 may be configured as or otherwise support a means for communicating based on the second signal approving the request.

Additionally, or alternatively, the communications manager 1420 may support wireless communications in accordance with examples as disclosed herein. For example, the communications manager 1420 may be configured as or otherwise support a means for receiving a first signal including a request to suspend a beam refinement process at a UE based on a resolution of a phase shifting operation at the UE. The communications manager 1420 may be configured as or otherwise support a means for transmitting a second signal approving the request to suspend the beam refinement process at the UE based on first location information for the UE and second location information for one or more other UEs. The communications manager 1420 may be configured as or otherwise support a means for communicating based on the second signal approving the request to suspend the beam refinement process at the UE.

By including or configuring the communications manager 1420 in accordance with examples as described herein, the device 1405 may support techniques for updating phase shifter resolution and beam refinement processes, which may provide for improved communication reliability, reduced latency, reduced power consumption, more efficient utilization of communication resources, improved coordination between devices, and longer battery life.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, the processor 1435, the memory 1425, the code 1430, or any combination thereof. For example, the code 1430 may include instructions executable by the processor 1435 to cause the device 1405 to perform various aspects of techniques for managing low or variable phase shift resolutions in beam-based communications as described herein, or the processor 1435 and the memory 1425 may be otherwise configured to perform or support such operations.

Figure 15:
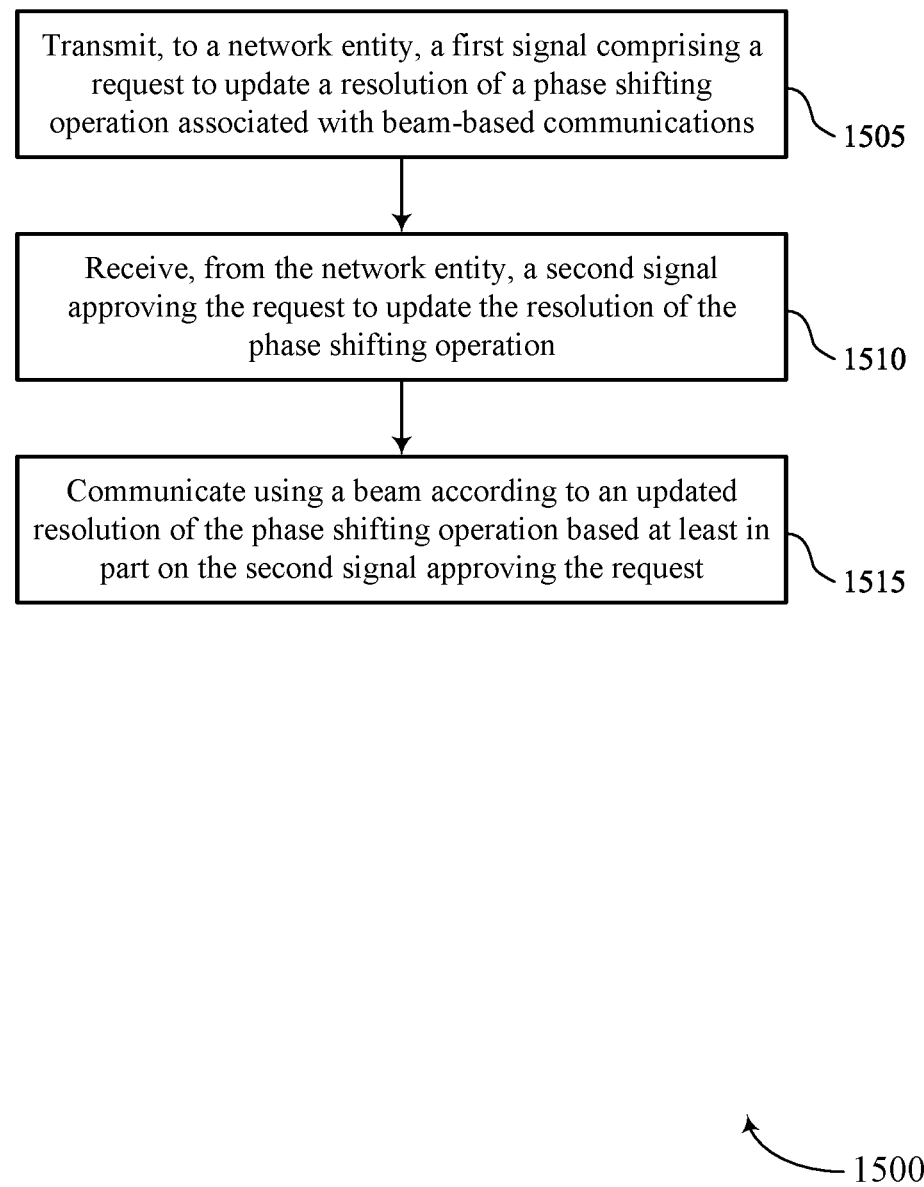
FIGS. 15 through 22 show flowcharts illustrating methods that support techniques for managing low or variable phase shift resolutions in beam-based communications in accordance with one or more aspects of the present disclosure.

FIG. 15 shows a flowchart illustrating a method 1500 that supports techniques for managing low or variable phase shift resolutions in beam-based communications in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include transmitting, to a network entity, a first signal including a request to update a resolution of a phase shifting operation associated with beam-based communications. The operations of 1505 may be performed in accordance with examples as disclosed herein. In some examples, aspects of the operations of 1505 may be performed by a resolution update component 925 as described with reference to FIG. 9.

At 1510, the method may include receiving, from the network entity, a second signal approving the request to update the resolution of the phase shifting operation. The operations of 1510 may be performed in accordance with examples as disclosed herein. In some examples, aspects of the operations of 1510 may be performed by a communications component 930 as described with reference to FIG. 9.

At 1515, the method may include communicating using a beam according to an updated resolution of the phase shifting operation based on the second signal approving the request. The operations of 1515 may be performed in accordance with examples as disclosed herein. In some examples, aspects of the operations of 1515 may be performed by a beam-based communications component 935 as described with reference to FIG. 9.

Figure 16:
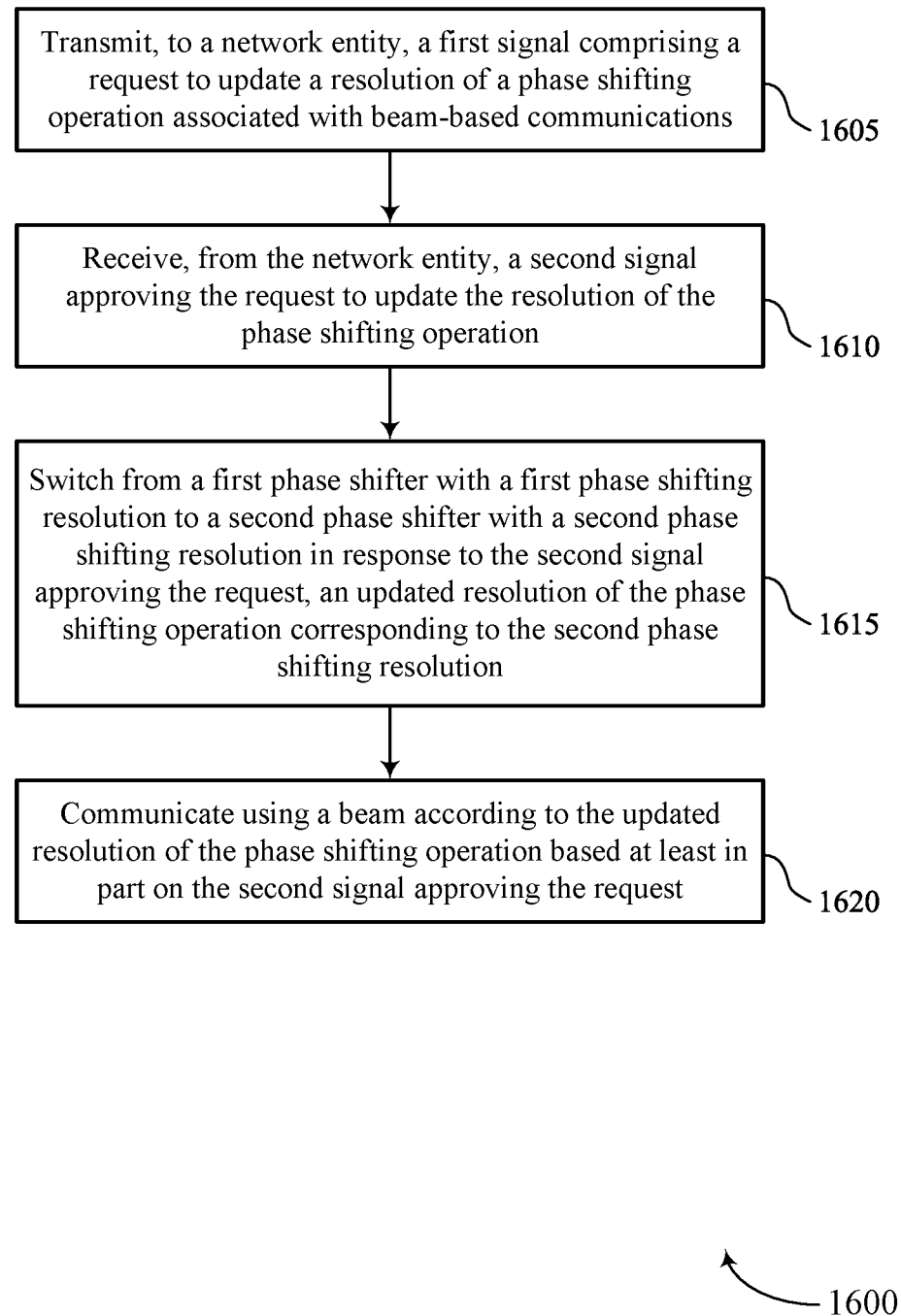

FIG. 16 shows a flowchart illustrating a method 1600 that supports techniques for managing low or variable phase shift resolutions in beam-based communications in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include transmitting, to a network entity, a first signal including a request to update a resolution of a phase shifting operation associated with beam-based communications. The operations of 1605 may be performed in accordance with examples as disclosed herein. In some examples, aspects of the operations of 1605 may be performed by a resolution update component 925 as described with reference to FIG. 9.

At 1610, the method may include receiving, from the network entity, a second signal approving the request to update the resolution of the phase shifting operation. The operations of 1610 may be performed in accordance with examples as disclosed herein. In some examples, aspects of the operations of 1610 may be performed by a communications component 930 as described with reference to FIG. 9.

At 1615, the method may include switching from a first phase shifter with a first phase shifting resolution to a second phase shifter with a second phase shifting resolution in response to the second signal approving the request, an updated resolution of the phase shifting operation corresponding to the second phase shifting resolution. The operations of 1615 may be performed in accordance with examples as disclosed herein. In some examples, aspects of the operations of 1615 may be performed by a phase shifter component 950 as described with reference to FIG. 9.

At 1620, the method may include communicating using a beam according to the updated resolution of the phase shifting operation based on the second signal approving the request. The operations of 1620 may be performed in accordance with examples as disclosed herein. In some examples, aspects of the operations of 1620 may be performed by a beam-based communications component 935 as described with reference to FIG. 9.

Figure 17:
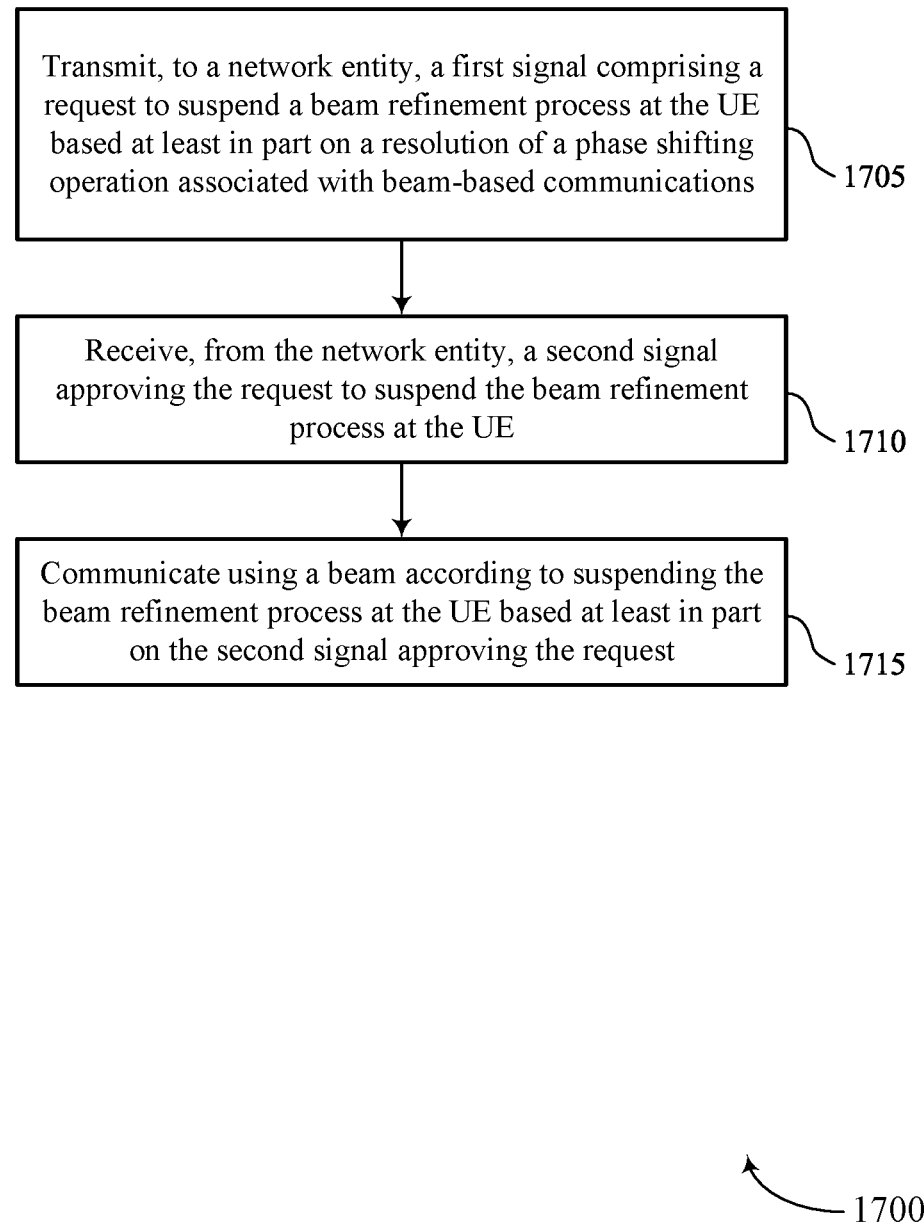

FIG. 17 shows a flowchart illustrating a method 1700 that supports techniques for managing low or variable phase shift resolutions in beam-based communications in accordance with one or more aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1705, the method may include transmitting, to a network entity, a first signal including a request to suspend a beam refinement process at the UE based on a resolution of a phase shifting operation associated with beam-based communications. The operations of 1705 may be performed in accordance with examples as disclosed herein. In some examples, aspects of the operations of 1705 may be performed by a beam refinement component 940 as described with reference to FIG. 9.

At 1710, the method may include receiving, from the network entity, a second signal approving the request to suspend the beam refinement process at the UE. The operations of 1710 may be performed in accordance with examples as disclosed herein. In some examples, aspects of the operations of 1710 may be performed by a communications component 930 as described with reference to FIG. 9.

At 1715, the method may include communicating using a beam according to suspending the beam refinement process at the UE based on the second signal approving the request. The operations of 1715 may be performed in accordance with examples as disclosed herein. In some examples, aspects of the operations of 1715 may be performed by a beam-based communications component 935 as described with reference to FIG. 9.

Figure 18:
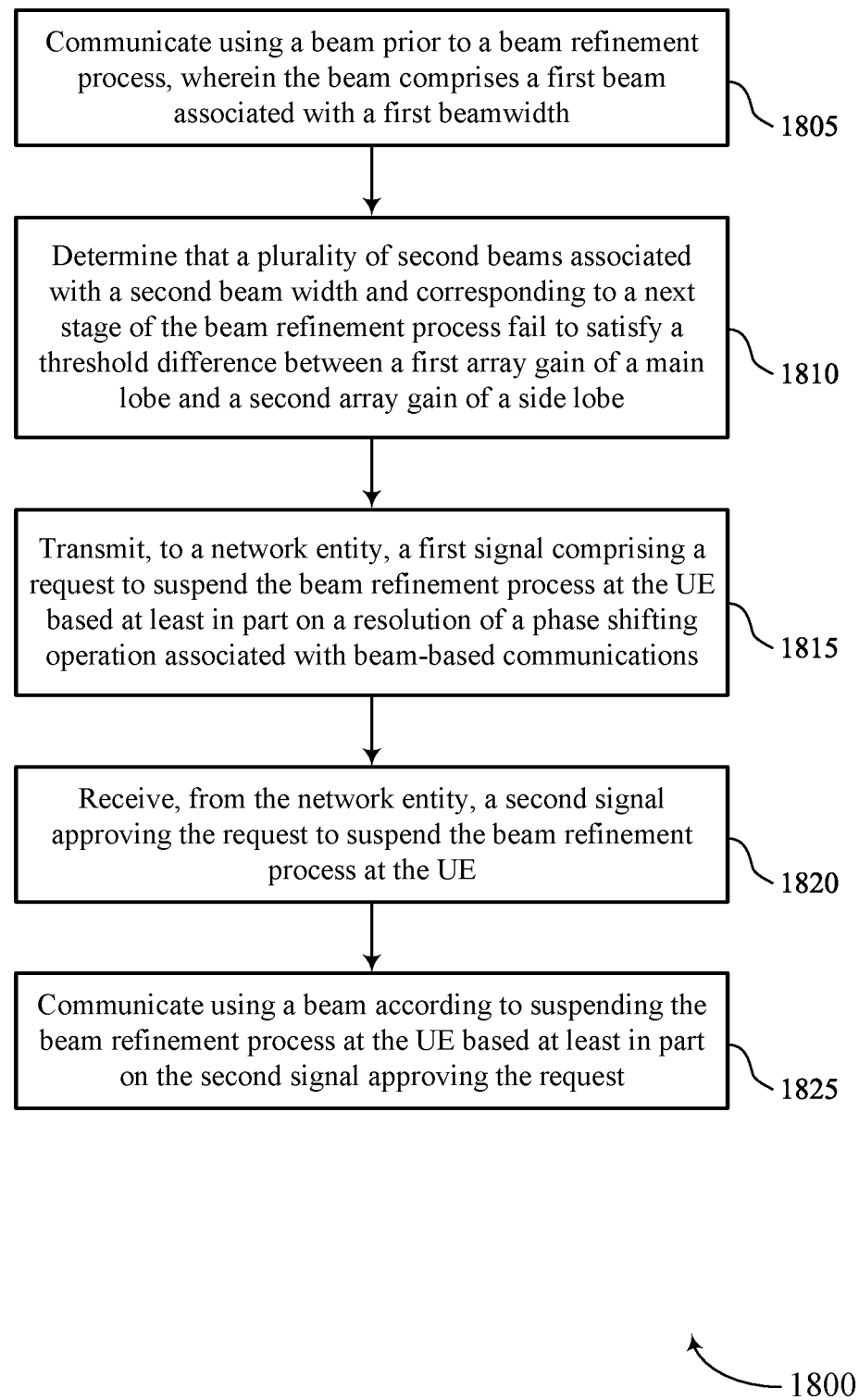

FIG. 18 shows a flowchart illustrating a method 1800 that supports techniques for managing low or variable phase shift resolutions in beam-based communications in accordance with one or more aspects of the present disclosure. The operations of the method 1800 may be implemented by a UE or its components as described herein. For example, the operations of the method 1800 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1805, the method may include communicating using a beam prior to a beam refinement process, where the beam includes a first beam associated with a first beamwidth. The operations of 1805 may be performed in accordance with examples as disclosed herein. In some examples, aspects of the operations of 1805 may be performed by a beam-based communications component 935 as described with reference to FIG. 9.

At 1810, the method may include determining that a set of multiple second beams associated with a second beamwidth and corresponding to a next stage of the beam refinement process fail to satisfy a threshold difference between a first array gain of a main lobe and a second array gain of a side lobe. The operations of 1810 may be performed in accordance with examples as disclosed herein. In some examples, aspects of the operations of 1810 may be performed by an array gain component 960 as described with reference to FIG. 9.

At 1815, the method may include transmitting, to a network entity, a first signal including a request to suspend the beam refinement process at the UE based on a resolution of a phase shifting operation associated with beam-based communications. The operations of 1815 may be performed in accordance with examples as disclosed herein. In some examples, aspects of the operations of 1815 may be performed by a beam refinement component 940 as described with reference to FIG. 9.

At 1820, the method may include receiving, from the network entity, a second signal approving the request to suspend the beam refinement process at the UE. The operations of 1820 may be performed in accordance with examples as disclosed herein. In some examples, aspects of the operations of 1820 may be performed by a communications component 930 as described with reference to FIG. 9.

At 1825, the method may include communicating using a beam according to suspending the beam refinement process at the UE based on the second signal approving the request. The operations of 1825 may be performed in accordance with examples as disclosed herein. In some examples, aspects of the operations of 1825 may be performed by a beam-based communications component 935 as described with reference to FIG. 9.

Figure 19:
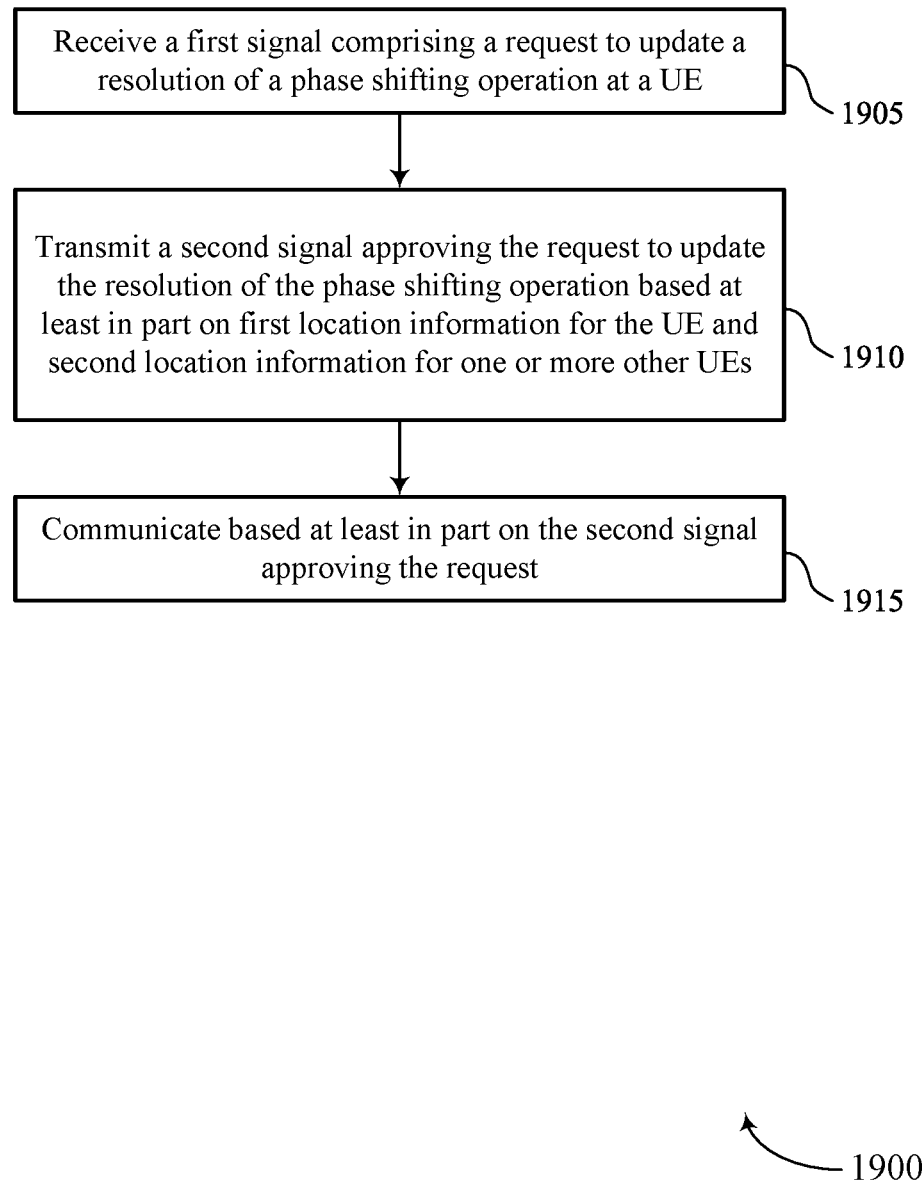

FIG. 19 shows a flowchart illustrating a method 1900 that supports techniques for managing low or variable phase shift resolutions in beam-based communications in accordance with one or more aspects of the present disclosure. The operations of the method 1900 may be implemented by a network entity or its components as described herein. For example, the operations of the method 1900 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1905, the method may include receiving a first signal including a request to update a resolution of a phase shifting operation at a UE. The operations of 1905 may be performed in accordance with examples as disclosed herein. In some examples, aspects of the operations of 1905 may be performed by a resolution update component 1325 as described with reference to FIG. 13.

At 1910, the method may include transmitting a second signal approving the request to update the resolution of the phase shifting operation based on first location information for the UE and second location information for one or more other UEs. The operations of 1910 may be performed in accordance with examples as disclosed herein. In some examples, aspects of the operations of 1910 may be performed by a communications component 1330 as described with reference to FIG. 13.

At 1915, the method may include communicating based on the second signal approving the request. The operations of 1915 may be performed in accordance with examples as disclosed herein. In some examples, aspects of the operations of 1915 may be performed by a beam-based communications component 1335 as described with reference to FIG. 13.

Figure 20:
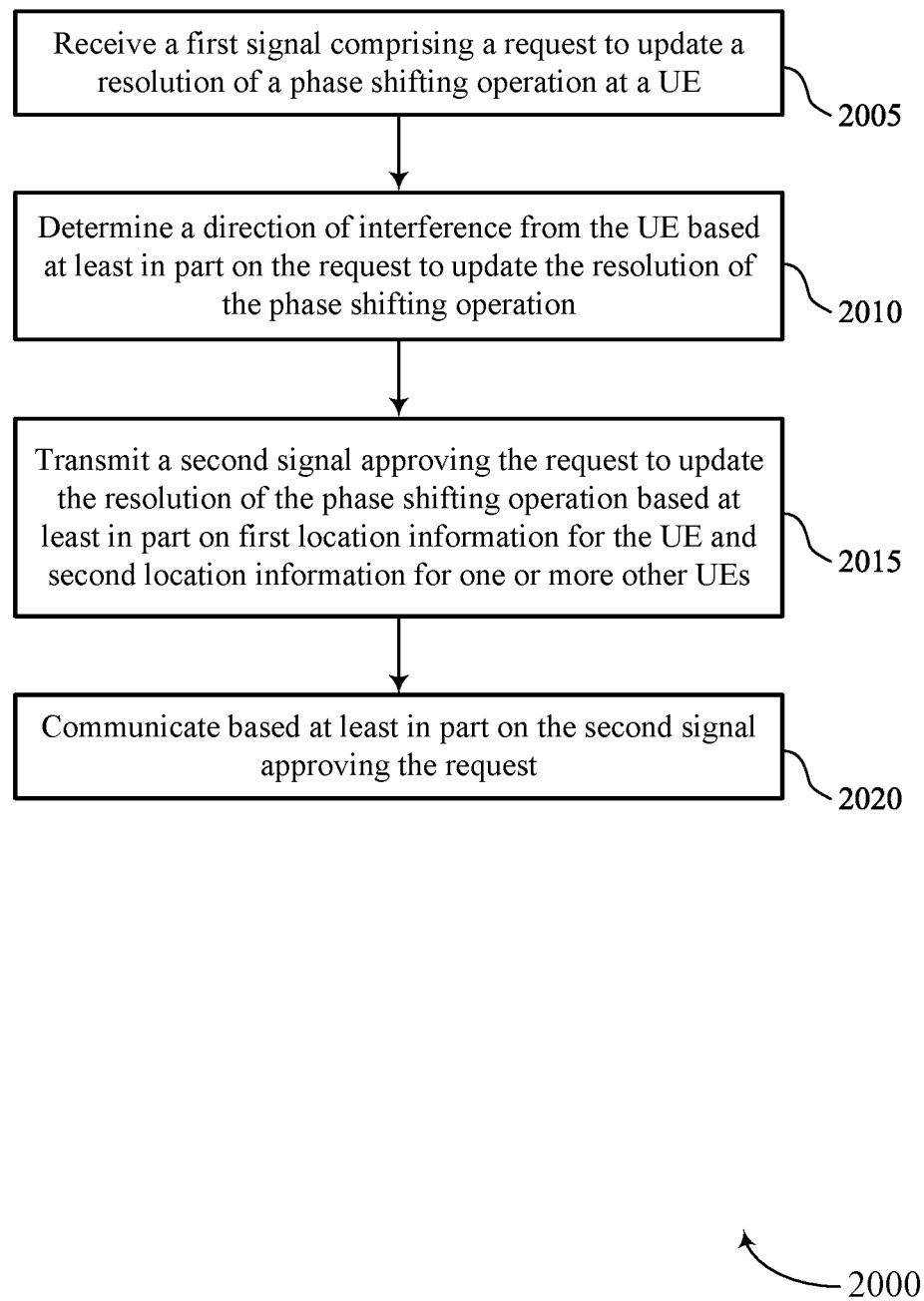

FIG. 20 shows a flowchart illustrating a method 2000 that supports techniques for managing low or variable phase shift resolutions in beam-based communications in accordance with one or more aspects of the present disclosure. The operations of the method 2000 may be implemented by a network entity or its components as described herein. For example, the operations of the method 2000 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 2005, the method may include receiving a first signal including a request to update a resolution of a phase shifting operation at a UE. The operations of 2005 may be performed in accordance with examples as disclosed herein. In some examples, aspects of the operations of 2005 may be performed by a resolution update component 1325 as described with reference to FIG. 13.

At 2010, the method may include determining a direction of interference from the UE based on the request to update the resolution of the phase shifting operation. The operations of 2010 may be performed in accordance with examples as disclosed herein. In some examples, aspects of the operations of 2010 may be performed by an interference component 1350 as described with reference to FIG. 13.

At 2015, the method may include transmitting a second signal approving the request to update the resolution of the phase shifting operation based on first location information for the UE and second location information for one or more other UEs. The operations of 2015 may be performed in accordance with examples as disclosed herein. In some examples, aspects of the operations of 2015 may be performed by a communications component 1330 as described with reference to FIG. 13.

At 2020, the method may include communicating based on the second signal approving the request. The operations of 2020 may be performed in accordance with examples as disclosed herein. In some examples, aspects of the operations of 2020 may be performed by a beam-based communications component 1335 as described with reference to FIG. 13.

Figure 21:
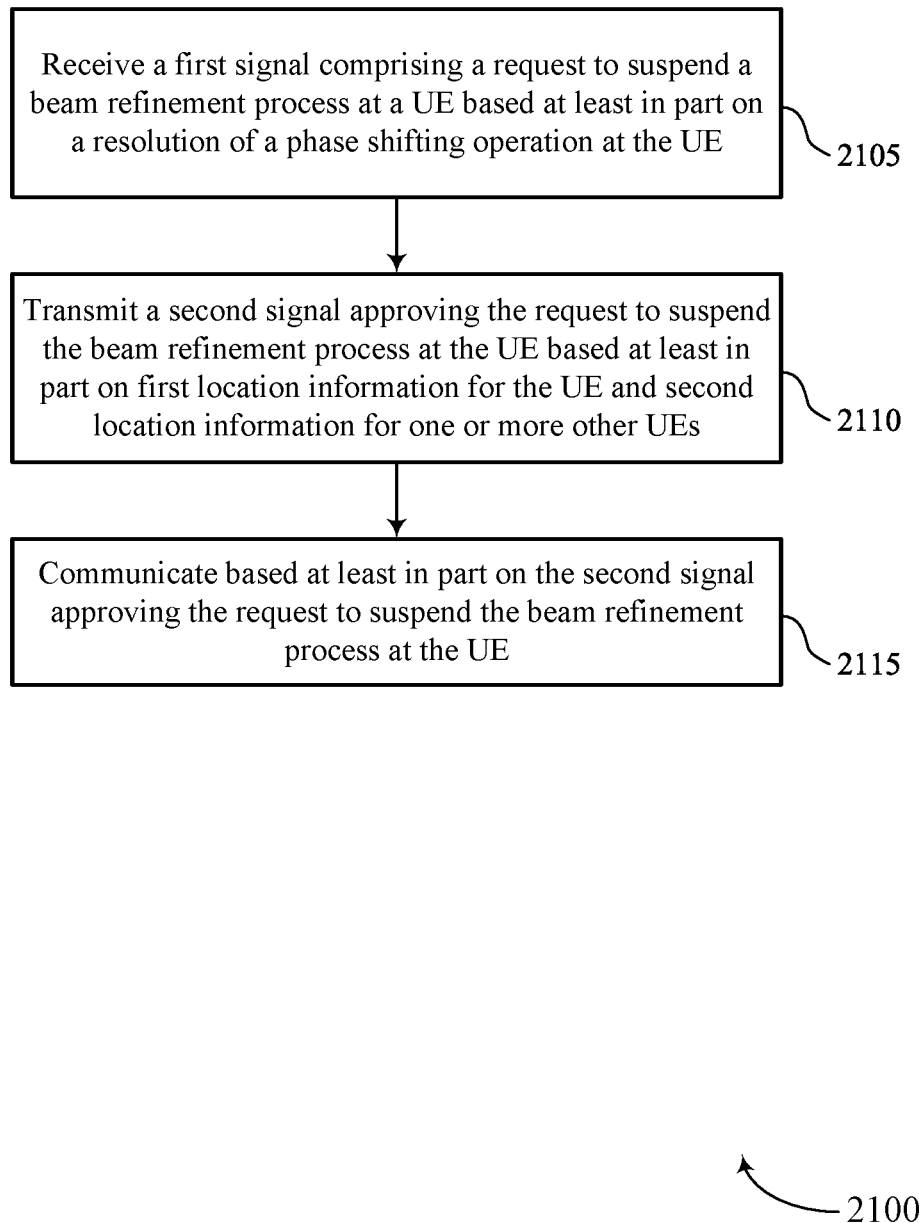

FIG. 21 shows a flowchart illustrating a method 2100 that supports techniques for managing low or variable phase shift resolutions in beam-based communications in accordance with one or more aspects of the present disclosure. The operations of the method 2100 may be implemented by a network entity or its components as described herein. For example, the operations of the method 2100 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 2105, the method may include receiving a first signal including a request to suspend a beam refinement process at a UE based on a resolution of a phase shifting operation at the UE. The operations of 2105 may be performed in accordance with examples as disclosed herein. In some examples, aspects of the operations of 2105 may be performed by a beam refinement component 1340 as described with reference to FIG. 13.

At 2110, the method may include transmitting a second signal approving the request to suspend the beam refinement process at the UE based on first location information for the UE and second location information for one or more other UEs. The operations of 2110 may be performed in accordance with examples as disclosed herein. In some examples, aspects of the operations of 2110 may be performed by a communications component 1330 as described with reference to FIG. 13.

At 2115, the method may include communicating based on the second signal approving the request to suspend the beam refinement process at the UE. The operations of 2115 may be performed in accordance with examples as disclosed herein. In some examples, aspects of the operations of 2115 may be performed by a beam-based communications component 1335 as described with reference to FIG. 13.

Figure 22:
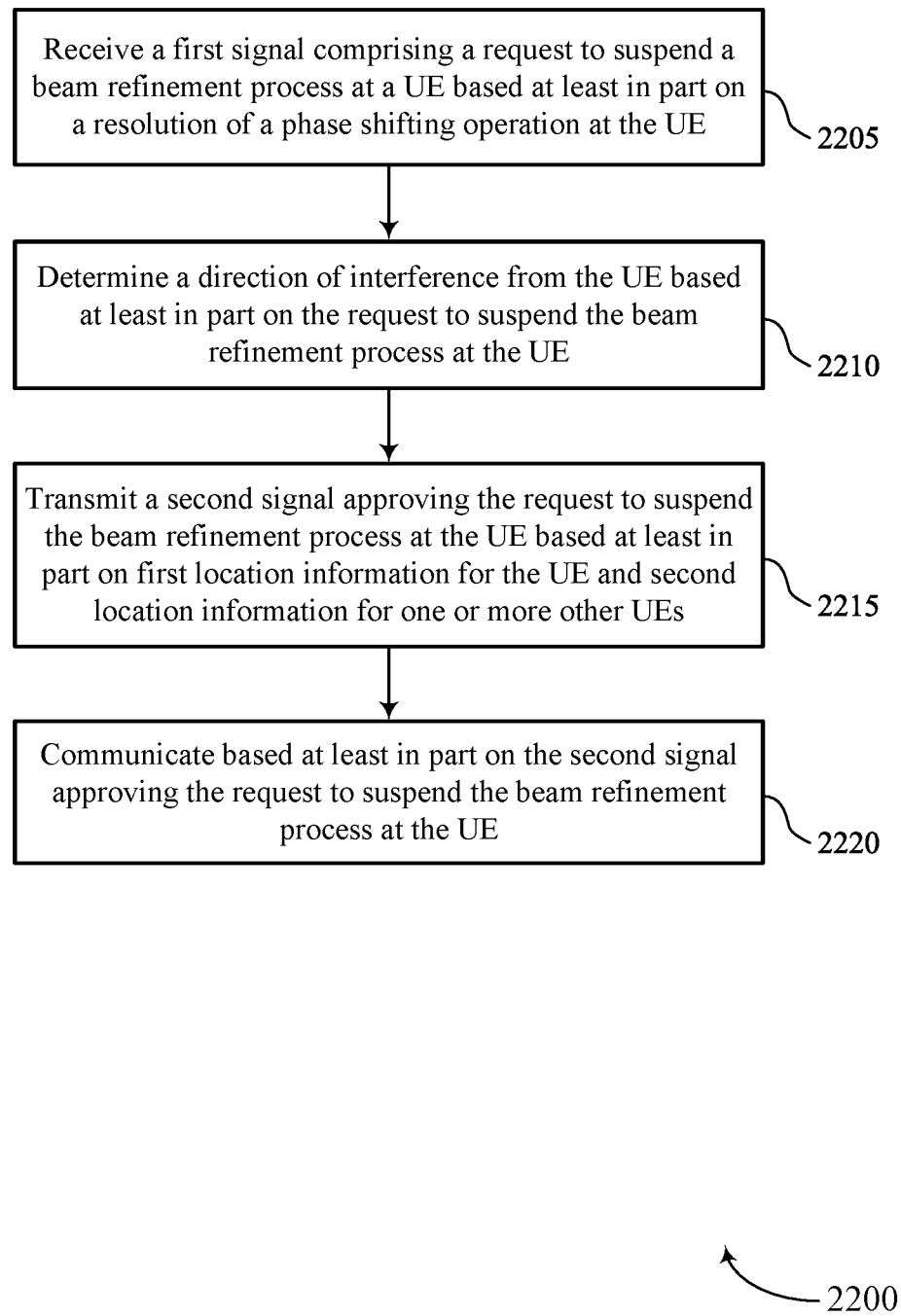

FIG. 22 shows a flowchart illustrating a method 2200 that supports techniques for managing low or variable phase shift resolutions in beam-based communications in accordance with one or more aspects of the present disclosure. The operations of the method 2200 may be implemented by a network entity or its components as described herein. For example, the operations of the method 2200 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 2205, the method may include receiving a first signal including a request to suspend a beam refinement process at a UE based on a resolution of a phase shifting operation at the UE. The operations of 2205 may be performed in accordance with examples as disclosed herein. In some examples, aspects of the operations of 2205 may be performed by a beam refinement component 1340 as described with reference to FIG. 13.

At 2210, the method may include determining a direction of interference from the UE based on the request to suspend the beam refinement process at the UE. The operations of 2210 may be performed in accordance with examples as disclosed herein. In some examples, aspects of the operations of 2210 may be performed by an interference component 1350 as described with reference to FIG. 13.

At 2215, the method may include transmitting a second signal approving the request to suspend the beam refinement process at the UE based on first location information for the UE and second location information for one or more other UEs. The operations of 2215 may be performed in accordance with examples as disclosed herein. In some examples, aspects of the operations of 2215 may be performed by a communications component 1330 as described with reference to FIG. 13.

At 2220, the method may include communicating based on the second signal approving the request to suspend the beam refinement process at the UE. The operations of 2220 may be performed in accordance with examples as disclosed herein. In some examples, aspects of the operations of 2220 may be performed by a beam-based communications component 1335 as described with reference to FIG. 13.

The following provides an overview of aspects of the present disclosure:

Aspect 1: A method for wireless communications at a UE, comprising: transmitting, to a network entity, a first signal comprising a request to update a resolution of a phase shifting operation associated with beam-based communications; receiving, from the network entity, a second signal approving the request to update the resolution of the phase shifting operation; and communicating using a beam according to an updated resolution of the phase shifting operation based at least in part on the second signal approving the request.

Aspect 2: The method of aspect 1, further comprising: transmitting, to the network entity, a third signal comprising UE capability information indicating that the UE is capable of updating the resolution of the phase shifting operation, wherein the request to update the resolution of the phase shifting operation is based at least in part on the UE capability information.

Aspect 3: The method of any of aspects 1 through 2, further comprising: refraining from performing one or more steps of the phase shifting operation in response to the second signal approving the request, the updated resolution of the phase shifting operation corresponding to the refraining from performing the one or more steps.

Aspect 4: The method of aspect 3, wherein the phase shifting operation is based at least in part on a plurality of bits, the method further comprising: performing phase shifting using a subset of the plurality of bits for the phase shifting operation, wherein the refraining from performing the one or more steps is based at least in part on the subset of the plurality of bits.

Aspect 5: The method of any of aspects 1 through 4, wherein the UE is configured with a plurality of phase shifters comprising at least a first phase shifter and a second phase shifter, the method further comprising: switching from the first phase shifter with a first phase shifting resolution to the second phase shifter with a second phase shifting resolution in response to the second signal approving the request, the updated resolution of the phase shifting operation corresponding to the second phase shifting resolution.

Aspect 6: The method of any of aspects 1 through 5, wherein the first signal further indicates a power saving value for the update to the resolution of the phase shifting operation, a difference value between a first array gain of a main lobe and a second array gain of a side lobe in a selected direction for the beam-based communications, the selected direction of the side lobe with the second array gain, or a combination thereof, and the second signal approves the request based at least in part on the power saving value, the difference value, the selected direction of the side lobe, or a combination thereof Aspect 7: The method of aspect 6, wherein the first signal comprising the request to update the resolution of the phase shifting operation is transmitted based at least in part on the difference value satisfying a threshold difference value for the main lobe and the side lobe.

Aspect 8: The method of any of aspects 6 through 7, further comprising: storing a lookup table indicating the power saving value, the difference value, the selected direction of the side lobe, or a combination thereof based at least in part on the updated resolution of the phase shifting operation, wherein the first signal is based at least in part on the lookup table.

Aspect 9: The method of any of aspects 6 through 8, wherein the difference value between the first array gain of the main lobe and the second array gain of the side lobe is based at least in part on an antenna array size for the UE, a steering direction for the beam, the updated resolution of the phase shifting operation, or a combination thereof.

Aspect 10: The method of any of aspects 1 through 9, wherein the first signal comprises UCI, a first MAC-CE, a first RRC signal, or a combination thereof; and the second signal comprises DCI, a second MAC-CE, a second RRC signal, or a combination thereof Aspect 11: A method for wireless communications at a UE, comprising: transmitting, to a network entity, a first signal comprising a request to suspend a beam refinement process at the UE based at least in part on a resolution of a phase shifting operation associated with beam-based communications; receiving, from the network entity, a second signal approving the request to suspend the beam refinement process at the UE; and communicating using a beam according to suspending the beam refinement process at the UE based at least in part on the second signal approving the request.

Aspect 12: The method of aspect 11, further comprising: communicating using the beam prior to the beam refinement process, wherein the beam comprises a first beam associated with a first beamwidth; and determining that a plurality of second beams associated with a second beamwidth and corresponding to a next stage of the beam refinement process fail to satisfy a threshold difference between a first array gain of a main lobe and a second array gain of a side lobe, wherein the first signal comprising the request to suspend the beam refinement process is transmitted based at least in part on the determining.

Aspect 13: The method of aspect 11, further comprising: communicating using the beam prior to the beam refinement process, wherein the beam comprises a first beam associated with a first beamwidth; receiving one or more reference signals for the beam refinement process; selecting a second beam associated with a second beamwidth for a next stage of the beam refinement process based at least in part on the one or more reference signals; and determining that the second beam fails to satisfy a threshold difference between a first array gain of a main lobe and a second array gain of a side lobe, wherein the first signal comprising the request to suspend the beam refinement process is transmitted based at least in part on the determining.

Aspect 14: The method of any of aspects 11 through 13, further comprising: transmitting, to the network entity, a third signal comprising a second request to activate the beam refinement process at the UE; receiving, from the network entity, a fourth signal approving the second request to activate the beam refinement process at the UE; and performing the beam refinement process for the beam according to activating the beam refinement process at the UE based at least in part on the fourth signal.

Aspect 15: The method of any of aspects 11 through 14, wherein the second signal comprises a one-bit field indicating to activate or suspend the beam refinement process.

Aspect 16: The method of any of aspects 11 through 15, wherein the first signal comprising the request to suspend the beam refinement process is transmitted further based at least in part on a threshold difference between a first array gain of a main lobe and a second array gain of a side lobe, an interference threshold for the beam-based communications, one or more steering directions, or a combination thereof.

Aspect 17: A method for wireless communications, comprising: receiving a first signal comprising a request to update a resolution of a phase shifting operation at a UE; transmitting a second signal approving the request to update the resolution of the phase shifting operation based at least in part on first location information for the UE and second location information for one or more other UEs; and communicating based at least in part on the second signal approving the request.

Aspect 18: The method of aspect 17, further comprising: receiving, from a network entity, a third signal indicating at least a portion of the second location information for the one or more other UEs, wherein the second signal approves the request based at least in part on the third signal.

Aspect 19: The method of aspect 18, further comprising: transmitting a fourth signal requesting location information from the UE, the one or more other UEs, the network entity, or a combination thereof, wherein the second signal approves the request based at least in part on the fourth signal requesting the location information.

Aspect 20: The method of any of aspects 17 through 19, further comprising: determining a direction of interference from the UE based at least in part on the request to update the resolution of the phase shifting operation, wherein the second signal approves the request based at least in part on the direction of interference and the second location information for the one or more other UEs.

Aspect 21: The method of any of aspects 17 through 20, further comprising: receiving a third signal comprising a second request to update a resolution of a second phase shifting operation at a second UE; and transmitting a fourth signal denying the second request to update the resolution of the second phase shifting operation based at least in part on third location information for the second UE and the second location information for the one or more other UEs.

Aspect 22: The method of any of aspects 17 through 21, further comprising: receiving a third signal comprising UE capability information indicating that the UE is capable of updating the resolution of the phase shifting operation, wherein the request to update the resolution of the phase shifting operation is based at least in part on the UE capability information.

Aspect 23: The method of any of aspects 17 through 22, wherein the first signal further indicates a power saving value for the update to the resolution of the phase shifting operation, a difference value between a first array gain of a main lobe and a second array gain of a side lobe in a selected direction, the selected direction of the side lobe with the second array gain, or a combination thereof, and the second signal approves the request based at least in part on the power saving value, the difference value, the selected direction of the side lobe, or a combination thereof.

Aspect 24: The method of any of aspects 17 through 23, wherein the first signal comprises UCI, a first MAC-CE, a first RRC signal, or a combination thereof; and the second signal comprises DCI, a second MAC-CE, a second RRC signal, or a combination thereof Aspect 25: A method for wireless communications, comprising: receiving a first signal comprising a request to suspend a beam refinement process at a UE based at least in part on a resolution of a phase shifting operation at the UE; transmitting a second signal approving the request to suspend the beam refinement process at the UE based at least in part on first location information for the UE and second location information for one or more other UEs; and communicating based at least in part on the second signal approving the request to suspend the beam refinement process at the UE.

Aspect 26: The method of aspect 25, further comprising: receiving, from a network entity, a third signal indicating at least a portion of the second location information for the one or more other UEs, wherein the second signal approves the request based at least in part on the third signal.

Aspect 27: The method of aspect 26, further comprising: transmitting a fourth signal requesting location information from the UE, the one or more other UEs, the network entity, or a combination thereof, wherein the second signal approves the request based at least in part on the fourth signal requesting the location information.

Aspect 28: The method of any of aspects 25 through 27, further comprising: determining a direction of interference from the UE based at least in part on the request to suspend the beam refinement process at the UE, wherein the second signal approves the request to suspend the beam refinement process at the UE based at least in part on the direction of interference and the second location information for the one or more other UEs.

Aspect 29: The method of any of aspects 25 through 28, further comprising: receiving a third signal comprising a second request to suspend a second beam refinement process at a second UE; and transmitting a fourth signal denying the second request to suspend the second beam refinement process at the second UE based at least in part on third location information for the second UE and the second location information for the one or more other UEs.

Aspect 30: The method of any of aspects 25 through 29, further comprising: receiving a third signal comprising a second request to activate the beam refinement process at the UE; and transmitting a fourth signal approving the second request to activate the beam refinement process at the UE based at least in part on the first location information for the UE and the second location information for the one or more other UEs.

Aspect 31: An apparatus for wireless communications at a UE, comprising a processor; memory coupled with the processor; and instructions stored in the memory and executable by the processor to cause the apparatus to perform a method of any of aspects 1 through 10.

Aspect 32: An apparatus for wireless communications at a UE, comprising at least one means for performing a method of any of aspects 1 through 10.

Aspect 33: A non-transitory computer-readable medium storing code for wireless communications at a UE, the code comprising instructions executable by a processor to perform a method of any of aspects 1 through 10.

Aspect 34: An apparatus for wireless communications at a UE, comprising a processor; memory coupled with the processor; and instructions stored in the memory and executable by the processor to cause the apparatus to perform a method of any of aspects 11 through 16.

Aspect 35: An apparatus for wireless communications at a UE, comprising at least one means for performing a method of any of aspects 11 through 16.

Aspect 36: A non-transitory computer-readable medium storing code for wireless communications at a UE, the code comprising instructions executable by a processor to perform a method of any of aspects 11 through 16.

Aspect 37: An apparatus for wireless communications, comprising a processor; memory coupled with the processor; and instructions stored in the memory and executable by the processor to cause the apparatus to perform a method of any of aspects 17 through 24.

Aspect 38: An apparatus for wireless communications, comprising at least one means for performing a method of any of aspects 17 through 24.

Aspect 39: A non-transitory computer-readable medium storing code for wireless communications, the code comprising instructions executable by a processor to perform a method of any of aspects 17 through 24.

Aspect 40: An apparatus for wireless communications, comprising a processor; memory coupled with the processor; and instructions stored in the memory and executable by the processor to cause the apparatus to perform a method of any of aspects 25 through 30.

Aspect 41: An apparatus for wireless communications, comprising at least one means for performing a method of any of aspects 25 through 30.

Aspect 42: A non-transitory computer-readable medium storing code for wireless communications, the code comprising instructions executable by a processor to perform a method of any of aspects 25 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
 a processor;
 memory coupled with the processor; and
 instructions stored in the memory and executable by the processor to cause the apparatus to:
  transmit, to a network entity, a first signal comprising a request to update a resolution of a phase shifting operation associated with beam-based communications, wherein the first signal comprises uplink control information (UCI), a first medium access control (MAC) control element (CE), a first radio resource control (RRC) signal, or a combination thereof;
  receive, from the network entity, a second signal approving the request to update the resolution of the phase shifting operation, wherein the second signal comprises downlink control information (DCI), a second MAC-CE, a second RRC signal, or a combination thereof; and communicate using a beam according to an updated resolution of the phase shifting operation based at least in part on the second signal approving the request.

2. The apparatus of claim 1, wherein the instructions are further executable by the processor to cause the apparatus to:
transmit, to the network entity, a third signal comprising UE capability information indicating that the UE is capable of updating the resolution of the phase shifting operation, wherein the request to update the resolution of the phase shifting operation is based at least in part on the UE capability information.

3. The apparatus of claim 1, wherein the instructions are further executable by the processor to cause the apparatus to:
refrain from performing one or more steps of the phase shifting operation in response to the second signal approving the request, the updated resolution of the phase shifting operation corresponding to the refraining from performing the one or more steps.

4. The apparatus of claim 3, wherein the phase shifting operation is based at least in part on a plurality of bits, and the instructions are further executable by the processor to cause the apparatus to:
perform phase shifting using a subset of the plurality of bits for the phase shifting operation, wherein the refraining from performing the one or more steps is based at least in part on the subset of the plurality of bits.

5. The apparatus of claim 1, wherein the UE is configured with a plurality of phase shifters comprising at least a first phase shifter and a second phase shifter, and the instructions are further executable by the processor to cause the apparatus to:
switch from the first phase shifter with a first phase shifting resolution to the second phase shifter with a second phase shifting resolution in response to the second signal approving the request, the updated resolution of the phase shifting operation corresponding to the second phase shifting resolution.

6. The apparatus of claim 1, wherein the first signal further indicates a power saving value for the update to the resolution of the phase shifting operation, a difference value between a first array gain of a main lobe and a second array gain of a side lobe in a selected direction for the beam-based communications, the selected direction of the side lobe with the second array gain, or a combination thereof, and the second signal approves the request based at least in part on the power saving value, the difference value, the selected direction of the side lobe, or a combination thereof.

7. The apparatus of claim 6, wherein the first signal comprising the request to update the resolution of the phase shifting operation is transmitted based at least in part on the difference value satisfying a threshold difference value for the main lobe and the side lobe.

8. The apparatus of claim 6, wherein the instructions are further executable by the processor to cause the apparatus to:
store a lookup table indicating the power saving value, the difference value, the selected direction of the side lobe, or a combination thereof based at least in part on the updated resolution of the phase shifting operation, wherein the first signal is based at least in part on the lookup table.

9. The apparatus of claim 6, wherein the difference value between the first array gain of the main lobe and the second array gain of the side lobe is based at least in part on an antenna array size for the UE, a steering direction for the beam, the updated resolution of the phase shifting operation, or a combination thereof.

10. An apparatus for wireless communications at a user equipment (UE), comprising:
a processor;
memory coupled with the processor; and
instructions stored in the memory and executable by the processor to cause the apparatus to:
transmit, to a network entity, a first signal comprising a request to suspend a beam refinement process at the UE based at least in part on a resolution of a phase shifting operation associated with beam-based communications;
receive, from the network entity, a second signal approving the request to suspend the beam refinement process at the UE, wherein the second signal comprises a one-bit field indicating to activate or suspend the beam refinement process; and
communicate using a beam according to suspending the beam refinement process at the UE based at least in part on the second signal approving the request.

11. The apparatus of claim 10, wherein the instructions are further executable by the processor to cause the apparatus to:
communicate using the beam prior to the beam refinement process, wherein the beam comprises a first beam associated with a first beamwidth; and
determine that a plurality of second beams associated with a second beamwidth and corresponding to a next stage of the beam refinement process fail to satisfy a threshold difference between a first array gain of a main lobe and a second array gain of a side lobe, wherein the first signal comprising the request to suspend the beam refinement process is transmitted based at least in part on the determining.

12. The apparatus of claim 10, wherein the instructions are further executable by the processor to cause the apparatus to:
communicate using the beam prior to the beam refinement process, wherein the beam comprises a first beam associated with a first beamwidth;
receive one or more reference signals for the beam refinement process;
select a second beam associated with a second beamwidth for a next stage of the beam refinement process based at least in part on the one or more reference signals; and
determine that the second beam fails to satisfy a threshold difference between a first array gain of a main lobe and a second array gain of a side lobe, wherein the first signal comprising the request to suspend the beam refinement process is transmitted based at least in part on the determining.

13. The apparatus of claim 10, wherein the instructions are further executable by the processor to cause the apparatus to:
transmit, to the network entity, a third signal comprising a second request to activate the beam refinement process at the UE;
receive, from the network entity, a fourth signal approving the second request to activate the beam refinement process at the UE; and
perform the beam refinement process for the beam according to activating the beam refinement process at the UE based at least in part on the fourth signal.

14. The apparatus of claim 10, wherein the first signal comprising the request to suspend the beam refinement process is transmitted further based at least in part on a threshold difference between a first array gain of a main lobe and a second array gain of a side lobe, an interference threshold for the beam-based communications, one or more steering directions, or a combination thereof.

15. An apparatus for wireless communications, comprising:
a processor;
memory coupled with the processor; and
instructions stored in the memory and executable by the processor to cause the apparatus to:
receive a first signal comprising a request to update a resolution of a phase shifting operation at a user equipment (UE), wherein the first signal comprises uplink control information (UCI), a first medium access control (MAC) control element (CE), a first radio resource control (RRC) signal, or a combination thereof;
transmit a second signal approving the request to update the resolution of the phase shifting operation based at least in part on first location information for the UE and second location information for one or more other UEs, wherein the second signal comprises downlink control information (DCI), a second MAC-CE, a second RRC signal, or a combination thereof; and
communicate based at least in part on the second signal approving the request.

16. The apparatus of claim 15, wherein the instructions are further executable by the processor to cause the apparatus to:
receive, from a network entity, a third signal indicating at least a portion of the second location information for the one or more other UEs, wherein the second signal approves the request based at least in part on the third signal.

17. The apparatus of claim 16, wherein the instructions are further executable by the processor to cause the apparatus to:
transmit a fourth signal requesting location information from the UE, the one or more other UEs, the network entity, or a combination thereof, wherein the second signal approves the request based at least in part on the fourth signal requesting the location information.

18. The apparatus of claim 15, wherein the instructions are further executable by the processor to cause the apparatus to:
determine a direction of interference from the UE based at least in part on the request to update the resolution of the phase shifting operation, wherein the second signal approves the request based at least in part on the direction of interference and the second location information for the one or more other UEs.

19. The apparatus of claim 15, wherein the instructions are further executable by the processor to cause the apparatus to:
receive a third signal comprising a second request to update a resolution of a second phase shifting operation at a second UE; and
transmit a fourth signal denying the second request to update the resolution of the second phase shifting operation based at least in part on third location information for the second UE and the second location information for the one or more other UEs.

20. The apparatus of claim 15, wherein the instructions are further executable by the processor to cause the apparatus to:
receive a third signal comprising UE capability information indicating that the UE is capable of updating the resolution of the phase shifting operation, wherein the request to update the resolution of the phase shifting operation is based at least in part on the UE capability information.

21. The apparatus of claim 15, wherein the first signal further indicates a power saving value for the update to the resolution of the phase shifting operation, a difference value between a first array gain of a main lobe and a second array gain of a side lobe in a selected direction, the selected direction of the side lobe with the second array gain, or a combination thereof, and the second signal approves the request based at least in part on the power saving value, the difference value, the selected direction of the side lobe, or a combination thereof.

22. An apparatus for wireless communications, comprising:
a processor;
memory coupled with the processor; and
instructions stored in the memory and executable by the processor to cause the apparatus to:
receive a first signal comprising a request to suspend a beam refinement process at a user equipment (UE) based at least in part on a resolution of a phase shifting operation at the UE;
transmit a second signal approving the request to suspend the beam refinement process at the UE based at least in part on first location information for the UE and second location information for one or more other UEs, wherein the second signal comprises a one-bit field indicating to activate or suspend the beam refinement process; and
communicate based at least in part on the second signal approving the request to suspend the beam refinement process at the UE.

23. The apparatus of claim 22, wherein the instructions are further executable by the processor to cause the apparatus to:
receive, from a network entity, a third signal indicating at least a portion of the second location information for the one or more other UEs, wherein the second signal approves the request based at least in part on the third signal.

24. The apparatus of claim 23, wherein the instructions are further executable by the processor to cause the apparatus to:
transmit a fourth signal requesting location information from the UE, the one or more other UEs, the network entity, or a combination thereof, wherein the second signal approves the request based at least in part on the fourth signal requesting the location information.

25. The apparatus of claim 22, wherein the instructions are further executable by the processor to cause the apparatus to:
determine a direction of interference from the UE based at least in part on the request to suspend the beam refinement process at the UE, wherein the second signal approves the request to suspend the beam refinement process at the UE based at least in part on the direction of interference and the second location information for the one or more other UEs.

26. The apparatus of claim 22, wherein the instructions are further executable by the processor to cause the apparatus to:

receive a third signal comprising a second request to suspend a second beam refinement process at a second UE; and transmit a fourth signal denying the second request to suspend the second beam refinement process at the second UE based at least in part on third location information for the second UE and the second location information for the one or more other UEs.

27. The apparatus of claim 22, wherein the instructions are further executable by the processor to cause the apparatus to:

receive a third signal comprising a second request to activate the beam refinement process at the UE; and transmit a fourth signal approving the second request to activate the beam refinement process at the UE based at least in part on the first location information for the UE and the second location information for the one or more other UEs.

* * * * *